United States Patent [19]

Ishida

[11] Patent Number: 5,790,263
[45] Date of Patent: Aug. 4, 1998

[54] COMMUNICATION APPARATUS

[75] Inventor: Yasushi Ishida, Tokyo, Japan

[73] Assignee: Canon Kabushiki Kaisha, Tokyo, Japan

[21] Appl. No.: 323,062

[22] Filed: Oct. 14, 1994

Related U.S. Application Data

[63] Continuation of Ser. No. 971,045, Nov. 2, 1992, abandoned.

[30] Foreign Application Priority Data

Nov. 19, 1991 [JP] Japan ..................... 3-303276

[51] Int. Cl.$^6$ ............ H04N 1/00; H04N 1/387; H04N 1/32
[52] U.S. Cl. ............ 358/401; 358/453; 358/468; 358/296
[58] Field of Search ............ 358/400, 401, 358/451, 452, 453, 405, 439, 468, 501, 296; 355/244

[56] References Cited

U.S. PATENT DOCUMENTS

| | | |
|---|---|---|
| 4,901,158 | 2/1990 | Sato et al. .................. 358/296 |
| 4,908,714 | 3/1990 | Iriyama et al. .................. 358/439 |
| 4,943,833 | 7/1990 | Fukushima .................. 355/244 |
| 5,140,442 | 8/1992 | Shigemura et al. .................. 358/401 |
| 5,278,666 | 1/1994 | Satomi .................. 358/405 |

*Primary Examiner*—Thomas D. Lee
*Attorney, Agent, or Firm*—Fitzpatrick, Cella, Harper & Scinto

[57] ABSTRACT

A communication apparatus includes a stamp or the like along a conveying path to perform stamping on a recording sheet. By performing stamping using a recording material which is different from a recording material used in a recording unit, an output image from the communication apparatus is identified. When the image output from the communication apparatus is copied by a copier, the image output from the communication apparatus can be definitively discriminated from a copied image which is a recorded image obtained using a single recording material.

42 Claims, 30 Drawing Sheets

THE SLEREXE COMPANY LIMITED

SAPORS LANE – BOOLE – DORSET – BH 25 8 ER

TELEPHONE BOOLE (945 13) 51617 – TELEX 123456

[ORIGINAL]

Our Ref. 350/PJC/EAC            18th January, 1972.

[ORIGINAL]

Dr. P. N. Cundall,
Mining Surveys Ltd.,
Holroyd Road,
Reading,
Berks.

[ORIGINAL]

Dear Pete,

Permit me to introduce you to the facility of facsimile transmission.

In facsimile a photocell is caused to perform a raster scan over the subject copy. The variations of print density on the document cause the photocell to generate an analogous electrical video signal. This signal is used to modulate a carrier, which is transmitted to a remote destination over a radio or cable communications link.

[ORIGINAL]

At the remote terminal, demodulation reconstructs the video signal, which is used to modulate the density of print produced by a printing device. This device is scanning in a raster scan synchronised with that at the transmitting terminal. As a result, a facsimile copy of the subject document is produced.

[ORIGINAL]

Probably you have uses for this facility in your organisation.

Yours sincerely,

*Phil.*

P. J. CROSS      [ORIGINAL]
Group Leader – Facsimile Research

[ORIGINAL]

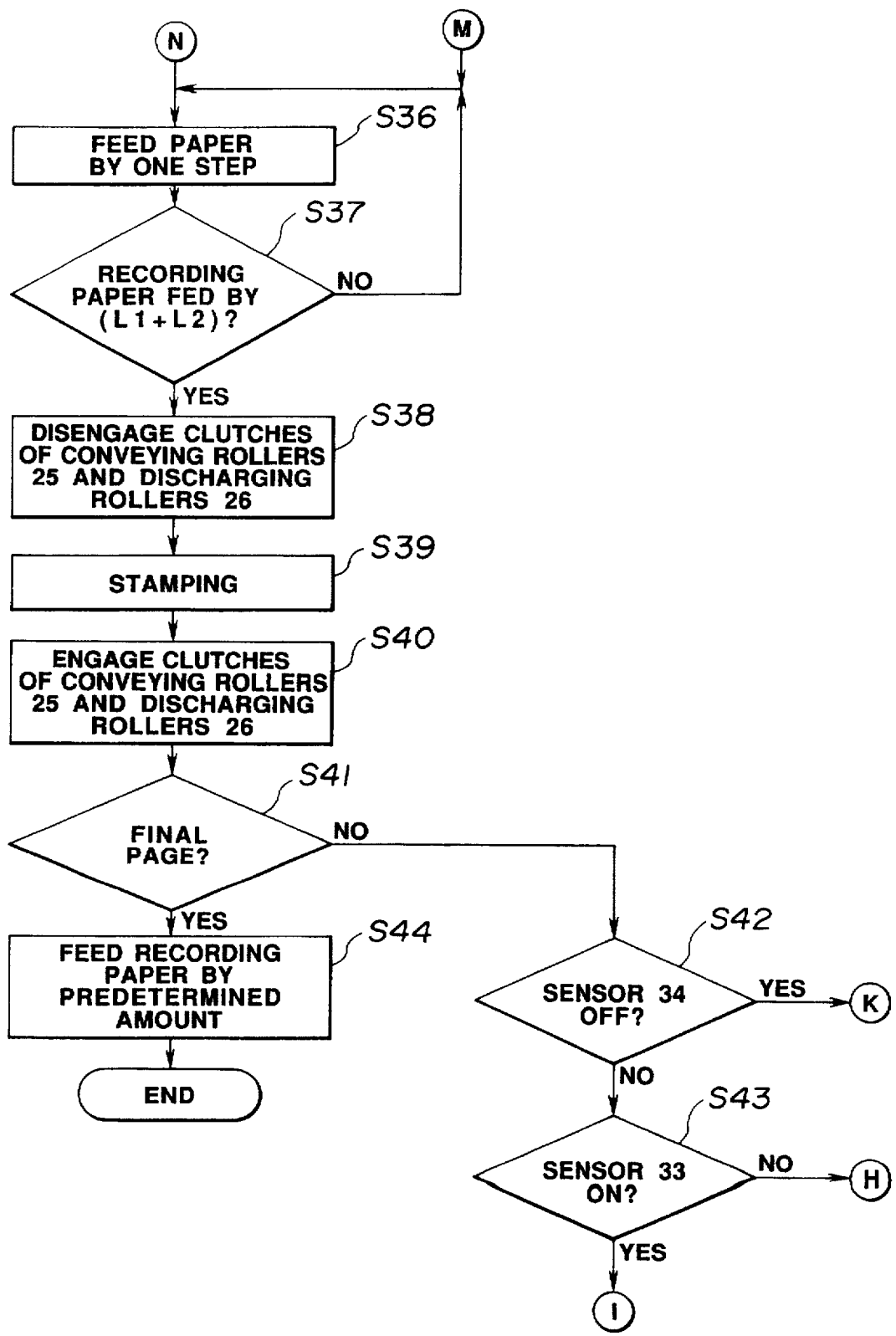

COMMUNICATION APPARATUS

This application is a continuation of application Ser. No. 07/971,045 filed Nov. 2, 1992, now abandoned.

BACKGROUND OF THE INVENTION

1. Field of the Invention

This invention relates to a communication apparatus, such as a facsimile apparatus or the like, and more particularly, to a communication apparatus which outputs a characteristic image in order to discriminate definitively an original image received by the apparatus from an image obtained by copying the original.

2. Description of the Related Art

Communication apparatuses, such as facsimile apparatuses or the like, which perform recording on ordinary paper have become more and more popular. One type of such apparatus adopts an LBP (laser-beam printer) recording method in which a recording unit including a photosensitive drum is provided, and image information formed on the photosensitive drum is developed to obtain a toner image. In a facsimile apparatus, for example, the opportunity to perform a copying operation using a recording unit which has been used in recording of an original received by the apparatus has increased, since the facsimile apparatus in general has a copying function. Recently, composite apparatuses each provided with the functions of a copier, a facsimile apparatus and a printer have been diffused, and the ability to perform an outputting operation of a received image and a copying operation of the output image using the same recording unit has increased.

However, in an electrophotographic facsimile apparatus which uses toner, since images are recorded on ordinary paper, it is difficult to discriminate a received original output from the apparatus from an image obtained by copying the received original.

When a facsimile apparatus is used in a company or the like, the facsimile operator first sees addresses for a received image. If a plurality of addresses are present, the operator provides the necessary number of copies of the received image and distributes the copies. At that time, the received original is in most cases distributed to the most pertinent address.

Such an approach, however, has the disadvantage that a person who has received a facsimile message cannot know whether the message comprises the received original or a copy of the received original. Another disadvantage is that it is uncertain where the received original is located.

Moreover, if a person other than the facsimile operator deals with a received original, it may happen that although a plurality of addresses are indicated, the facsimile message is distributed to only one person.

In an apparatus which uses thermosensitive paper as recording paper, a received original can be easily discriminated from a copy since there is a definite difference between thermosensitive paper and copying paper. However, since the thermosensitive paper presents problems in its storage and handling properties, thermosensitive-paper recording is being replaced by ordinary-paper recording. Hence, the opportunity of discriminating a received original from a copy by noting the difference between thermosensitive paper and copying paper will decrease.

The above-described problems can be overcome if it is arranged that a received original must be always filed and only copies of the received original are distributed. This approach, however, neccesitates making a copy of the original even if only one address is indicated in a received message. Moreover, the number of files and the space for receiving the files increase.

SUMMARY OF THE INVENTION

The present invention has been made in consideration of the above-described problems.

It is an object of the present invention to provide a communication apparatus which outputs a received image so that a received original can be definitively discrimated from a copy of the received original.

It is another object of the present invention to provide a communication apparatus capable of obtaining an output in which additional information synthesized with a received original can be discriminated.

It is still another object of the present invention to provide a communication apparatus which can discrimate a received output image from its copies by printing a stamp "ORIGINAL" or like on a recording sheet.

These and other objects, advantages and features of the present invention will become more apparent from the following detailed description of the preferred embodiments taken in conjuction with the accompanying drawings.

BRIEF DESCRIPTION OF THE DRAWINGS

FIG. 10 is a cross-sectional view of a communication apparatus which prints a stamp within a paper-feeding cassette according to still another embodiment of the present invention;

FIGS. 26 through 28 are samples of output images on which stamps are printed;

FIGS. 30 through 33 are flowcharts showing a stamping operation.

DETAILED DESCRIPTION OF THE PREFERRED EMBODIMENTS

Figure 1:
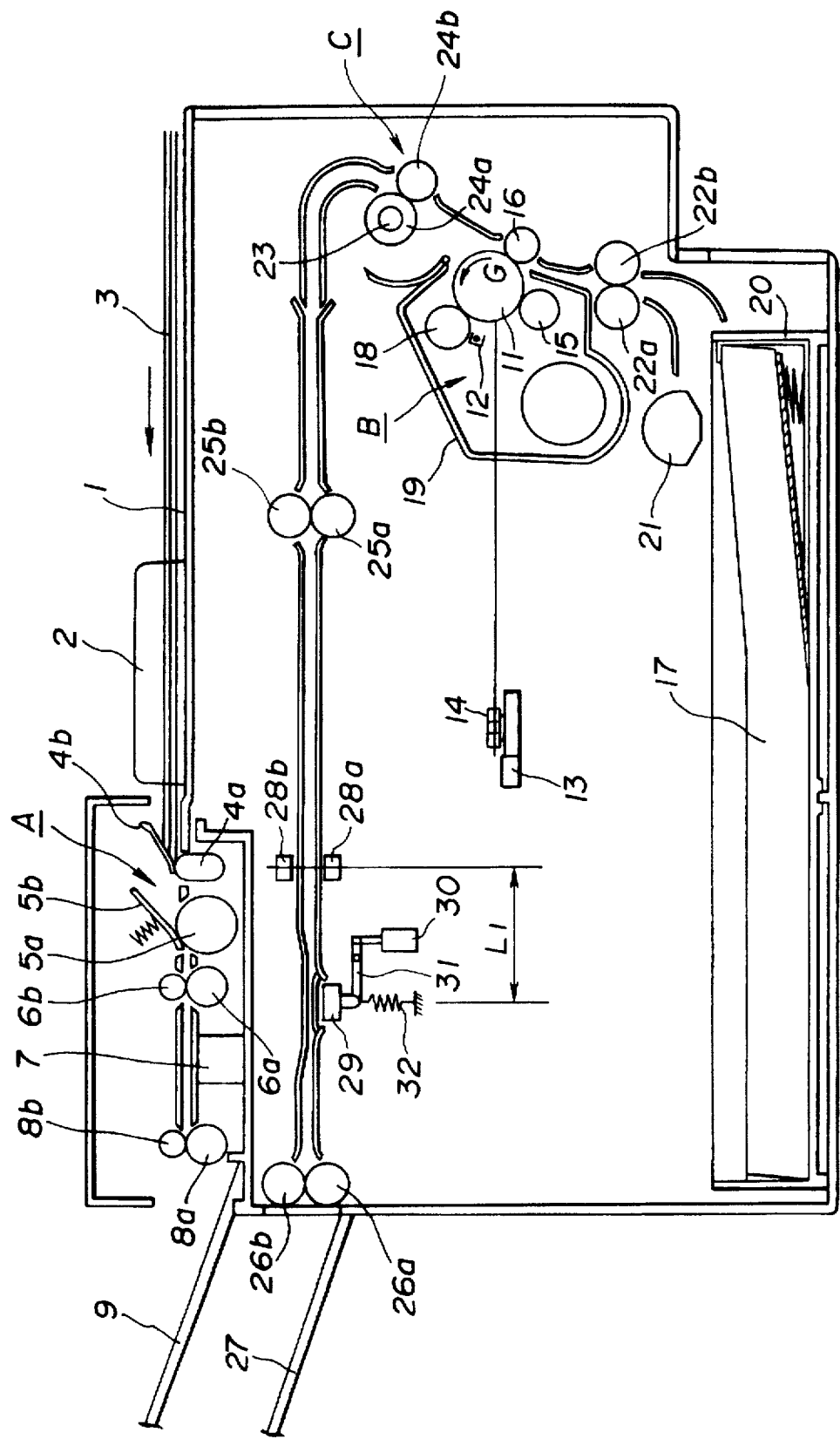
FIG. 1 is a cross-sectional view of a communication apparatus according to an embodiment of the present invention.
Figure 15:
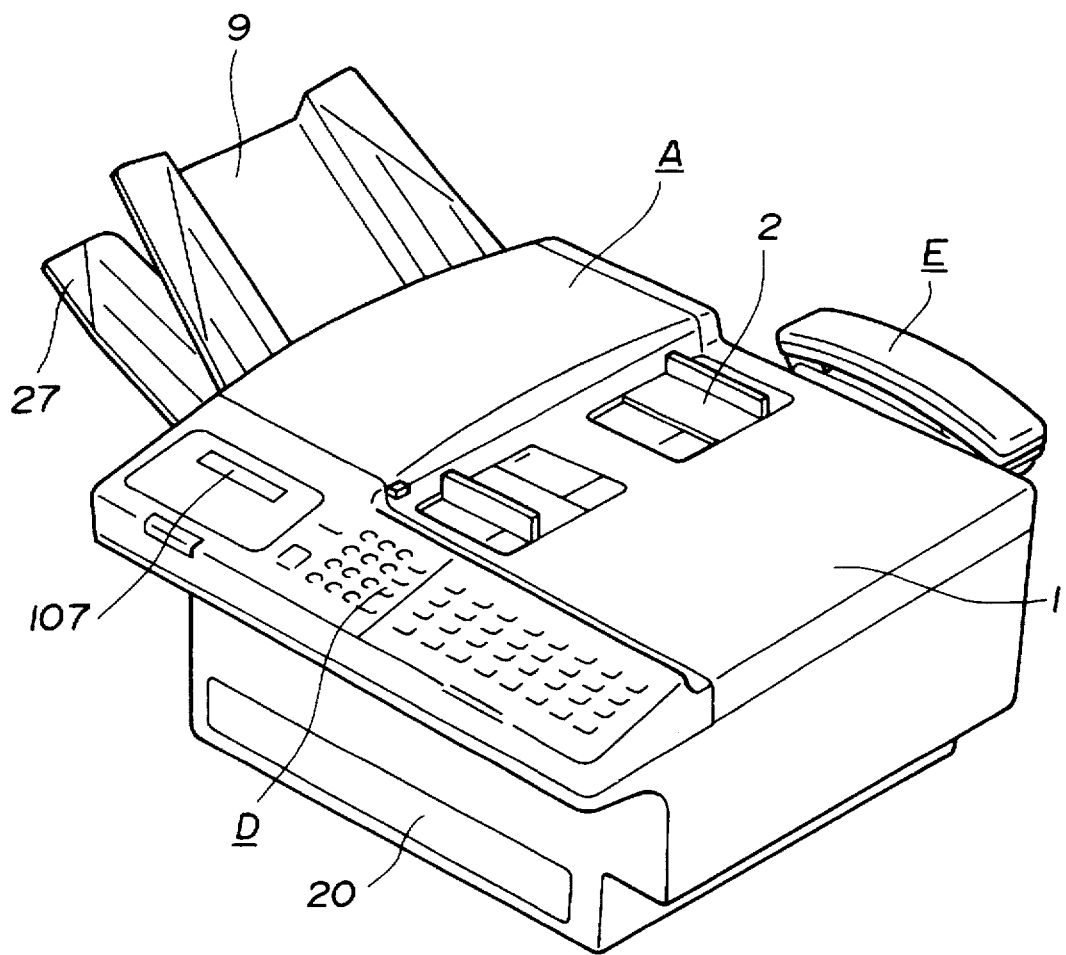
FIG. 15 is a perspective view of the communication apparatus shown in FIG. 1.
Figure 16:
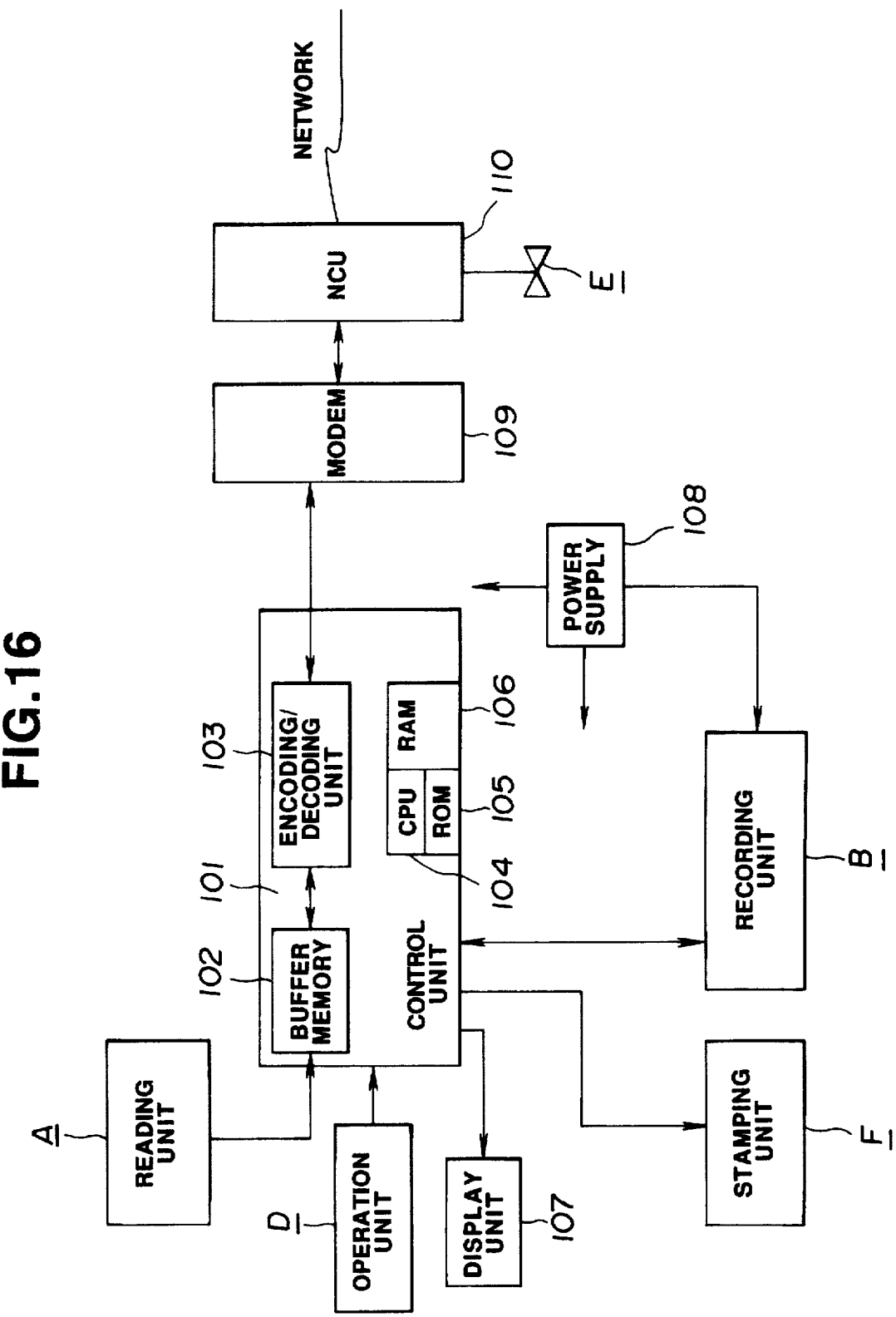
FIG. 16 is a block diagram of the communication apparatus shown in FIG. 1.

An explanation will now be provided of a communication apparatus according to an embodiment of the present invention. FIG. 1 is a cross-sectional view of the entire apparatus. FIG. 15 is a perspective view of the entire apparatus. FIG. 16 is a block diagram showing the schematic configuration of the apparatus.

The schematic configuration of the apparatus will be first explained with reference to FIG. 16.

In FIG. 16, a reading unit A photoelectrically reads an original and outputs a digital image signal representing an image of the original to a control unit 101. The reading unit A includes a motor for feeding the original, a CCD (charge-coupled device) image sensor and the like. Next, the configuration of the control unit 101 will be explained. A buffer memory 102 stores image information for one page. In the buffer memory 102, image data for one page input from the reading unit A are stored during transmission of an original or a copying operation, and decoded received image data are stored during reception of image data. An image is formed by outputting stored data to a recording unit B. An encoding/decoding unit 103 encodes image information to be transmitted by MH encoding or the like, and decodes received encoded image data into image data.

These respective units of the control unit 101 are controlled by a CPU (central processing unit) 104, such as a microprocessor or the like. In addition to the CPU 104, the control unit 101 includes a ROM (read-only memory) 105 storing control programs of the CPU 104 and various kinds of data, a RAM (random access memory) 106 for temporarily storing various kinds of data as work areas of the CPU 104, and the like. A recording unit B scans a photosensitive member with a laser beam and performs image recording on recording paper. The configuration of the recording unit B will be described later with reference to FIG. 1. An operation unit D includes keys to assign various kinds of functions, such as the start of transmission and the like, input keys of telephone numbers, and the like. A display unit 107, which is usually provided on the operation unit D, displays various kinds of functions, states of the apparatus, and the like. A power supply 108 supplies the entire apparatus with electric power. There are also shown a modem (modulator-demodulator) 109, a network control unit (NCU) 110, a telephone set E, and a stamping unit F which is a characteristic unit of the present invention.

The configuration of the respective units of the communication apparatus will now be sequentially explained.

Original-reading Unit

The configuration of the original-reading unit A is shown in FIG. 1. An original mount 1 is formed on the upper surface of the apparatus. Originals 3 are stacked on the original mount 1 with faces downward. The lowest one of the stacked originals 3, guided by side guides 2, is subject to preliminary conveyance by a preliminary conveying roller 4a and a pressure-contact member 4b in pressure contact therewith. The originals 3 are individually separated by a separation roller 5a and a pressure-contact member 5b in pressure contact therewith, and are fed to the left side of the main body of the apparatus as viewed in FIG. 1. The separated and fed original 3 is conveyed by a conveying roller 6a and a pinch roller 6b in pressure contact therewith. An image of the original is converted into an electrical signal by a contact sensor 7. The original 3 whose image has been read by the contact sensor 7 is discharged onto an original discharge tray 9 mounted at the left side of the main body of the apparatus by a discharging roller 8a and a pinch roller 8b in pressure contact therewith.

Recording Unit

In the present embodiment, the recording unit B, shown in FIG. 1, comprises a laser-beam printer, which has the following configuration. A charger 12, disposed around a photosensitive drum 11 rotating in the direction of arrow G, charges the surface of the drum 11. Light emitted from a laser oscillator 13, which oscillates a laser beam in accordance with an image signal, is reflected by a polygonal mirror 14, and exposes the rotating drum 11 to form an electrostatic latent image. The electrostatic latent image is visualized using toner by a developing unit 15. The toner image is recorded by being transferred onto a recording sheet 17 fed to a space between the photosensitive drum 11 and a transfer roller 16 in pressure contact therewith. After the toner image has been transferred, the photosensitive drum 11 is cleaned by a cleaning member 18.

The photosensitive drum 11, the charger 12, the developing unit 15 and the cleaning member 18 are accommodated within a recording cartridge 19, which is detachably accommodated in the main body of the apparatus.

Recording-sheet Conveying Unit

Next, an explanation will be provided of a recording-sheet conveying unit C also shown in FIG. 1. A cassette 20, for containing recording sheets 17, is detachably mounted on a lower portion of the main body of the apparatus. The recording sheets 17, comprising cut sheets, are stacked within the cassette 20. The uppermost sheet of the recording sheets 17 is fed by a semicircular feeding roller 21, and is conveyed by a pair of conveying rollers, comprising a driving roller 22a and a pinch roller 22b, in synchronization with the rotation of the photosensitive drum 11. While the recording sheet 17 passes through a space between the photosensitive drum 11 and the transfer roller 16, the image is transferred onto the recording sheet 17. The transferred toner image on the recording sheet 17 is fixed by applying heat and pressure while the recording sheet 17 passes through a space between a fixing roller 24a incorporating a heater 23, and a pressing roller 24b in pressure contact with the fixing roller 24a. Subsequently, the recording sheet 17 is discharged onto a recording-sheet discharge tray 27 by a pair of conveying rollers 25a and 25b, and a pair of discharging rollers 26a and 26b.

Stamping Unit

Figure 18:
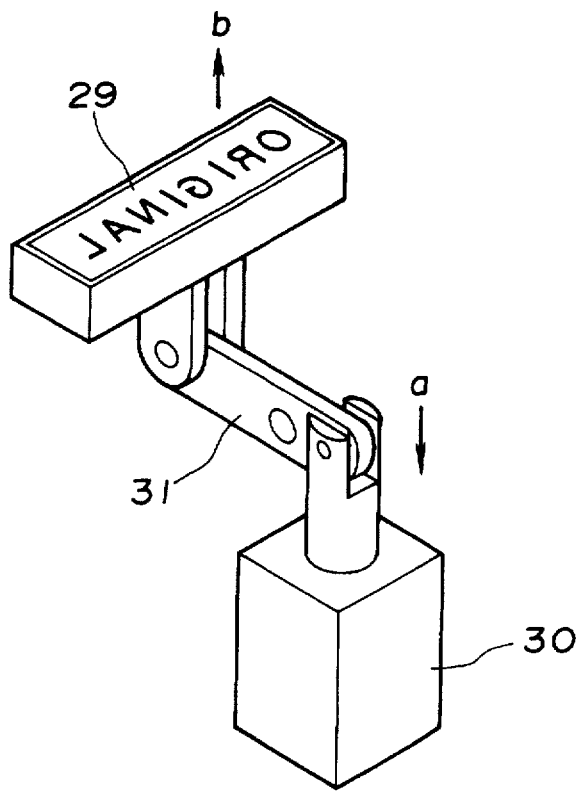
FIGS. 18 and 19 are perspective views of a stamping unit.

A stamping unit, also shown in FIG. 1, includes a stamp 29, a solenoid 30 for pressing the stamp 29 against the recording sheet 17, a member 31 which connects the solenoid 30 to the stamp 29, and a spring 32 for retracting the stamp 29 in a standby state. FIG. 18 is a perspective view of the stamping unit (the spring 32 is omitted).

In FIG. 18, when the solenoid 30 is turned on, the shaft of the solenoid is driven in the direction "a", whereby the stamp 29 is moved in the direction "b" via the member 31, to perform stamping on the recording sheet 17. The stamp 29 can perform continuous stamping. A color different from the color of the toner used by the recording unit is used as the color of the ink of the stamp 29. For example, if the color of the recorded image is black, red may be used as the color of the ink. It is thereby possible to definitely discriminate an original from a copy of the original made by a copier. If ink having a dropout color is used, characters printed on the original are not copied to a copy when a copy of the original is made by a copier. Accordingly, unnecessary characters will not be copied in a copying operation.

Figure 19:
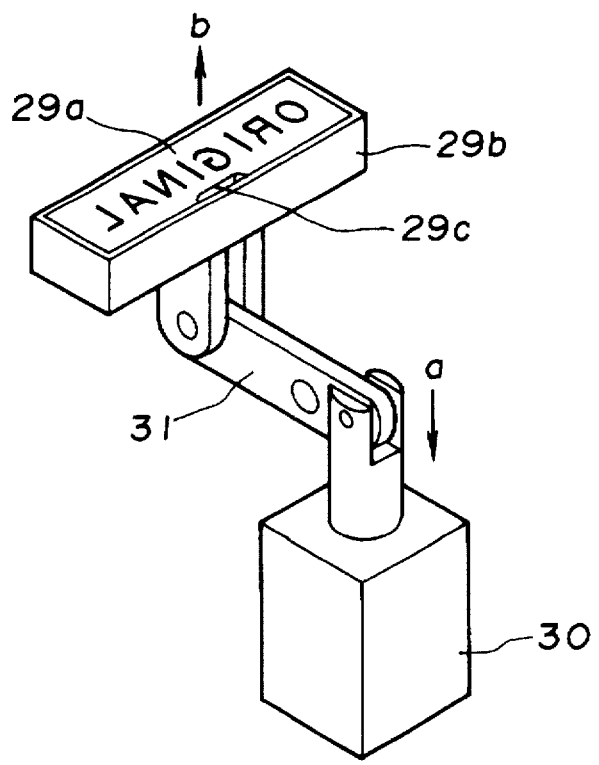

As illustrated in FIG. 19, a stamping rubber member 29a of the stamp 29 is accommodated within a stamp box 29b. The stamping rubber member 29a can be easily taken out from the stamp box 29b by putting tweezers or the like in a recess 29c provided in the stamping rubber member 29a.

Figure 22:
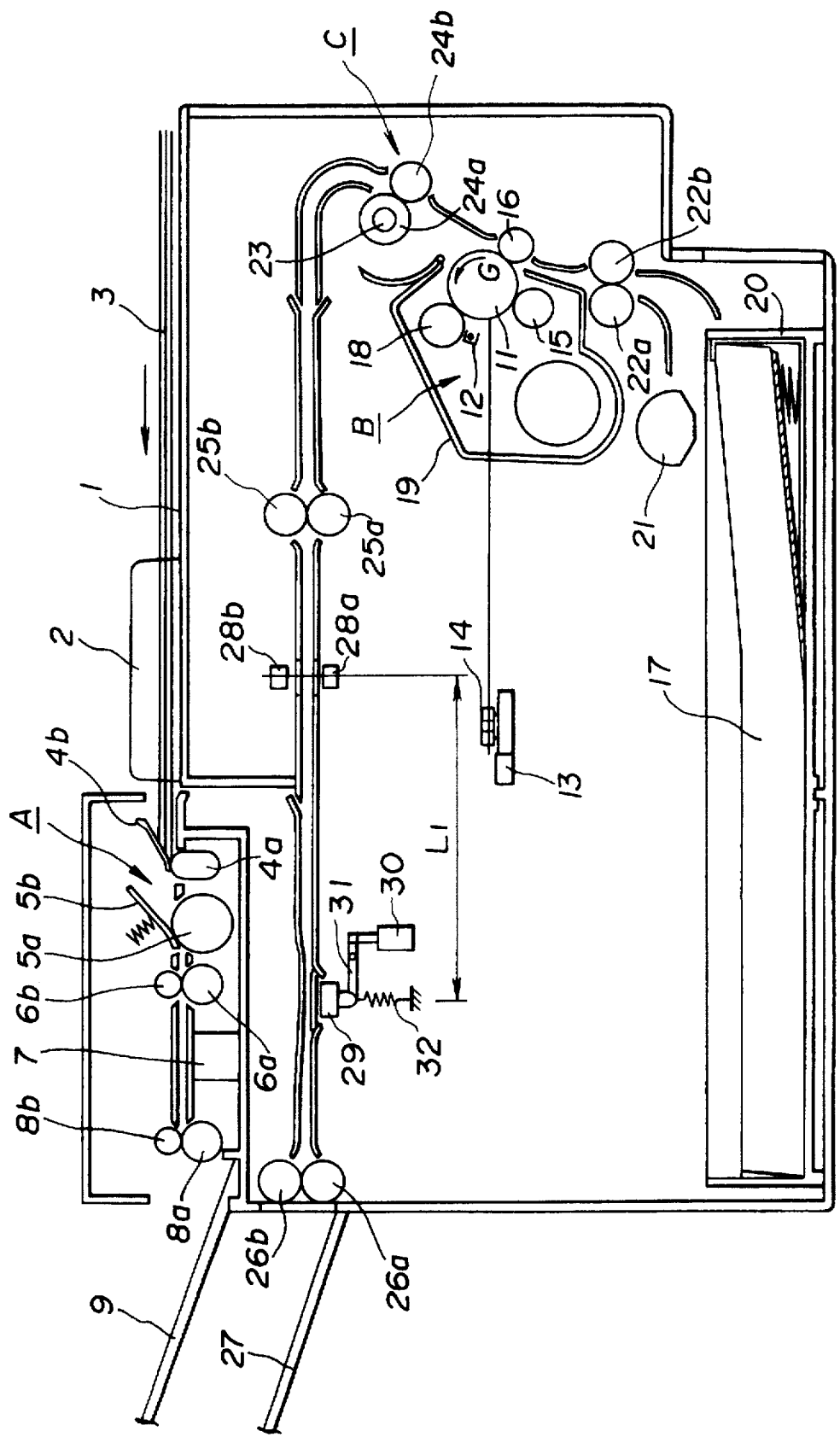
FIGS. 22 and 23 are cross-sectional views of the communication apparatus shown in FIG. 1 illustrating a method of exchanging a stamp.
Figure 23:
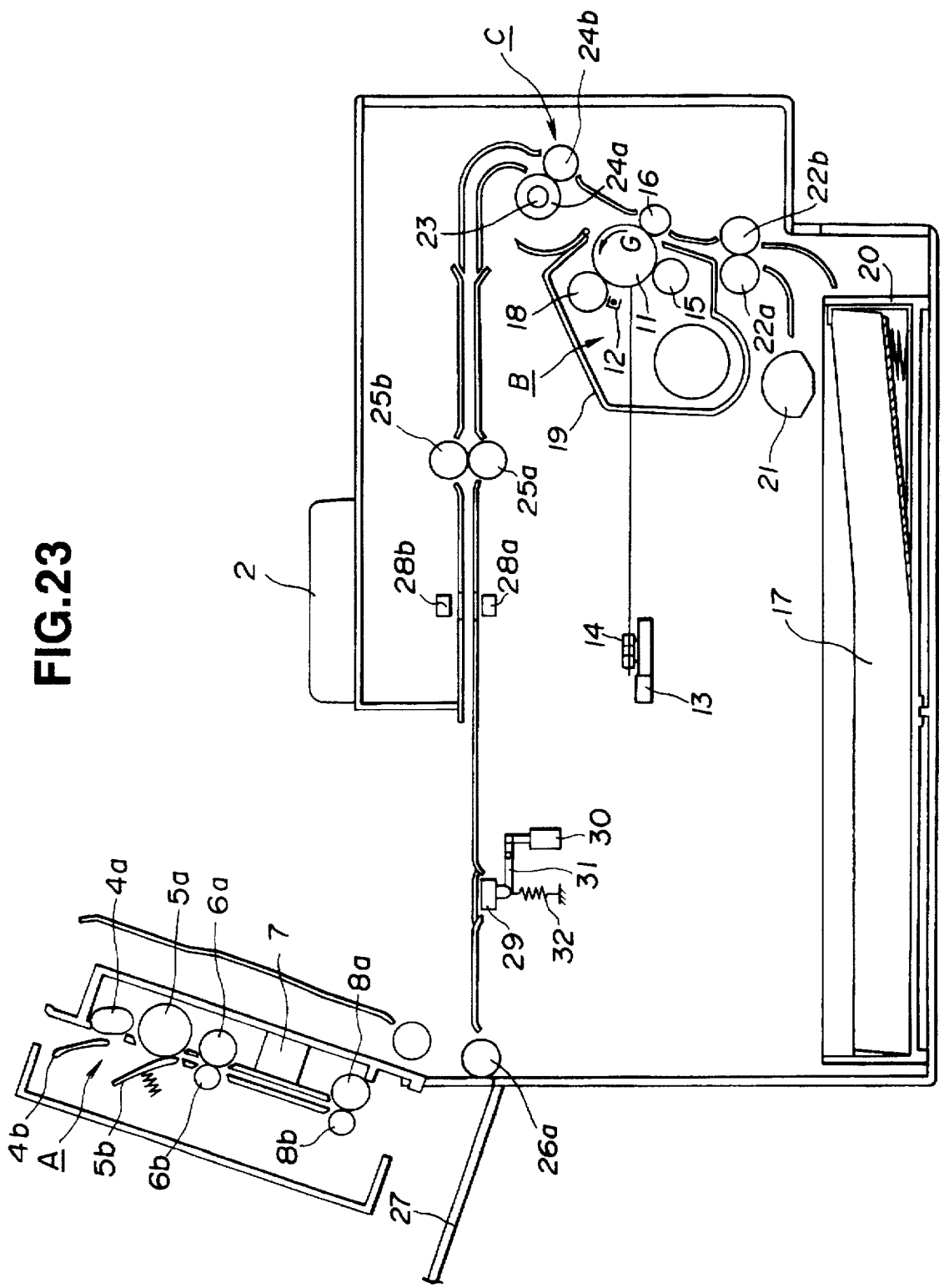

As shown in FIGS. 22 and 23, the original-reading unit A and the upper surface of the paper path around the stamp 29 are rotatably pivoted on the main body of the apparatus. Hence, the user or the serviceman can directly touch the stamp 29 and easily exchange the printing rubber member 29a (shown in FIG. 19). Since it is possible to change the characters of the stamp, for example, from "ORIGINAL" to "FILE" or the like, or change the color of the stamp 29, the range of selection by the user is widened.

Although in the above-described explanation, only the stamping rubber member 29a is exchanged when the stamp is exchanged, the present embodiment is not limited to such an approach. For example, the stamping rubber member 29a may be exchanged together with the stamp box 29b. Furthermore, although the stamp is exchanged from above, any other approach may be adopted provided that the stamp can be easily exchanged. The present embodiment also has the advantage that the operation of replenishing the ink of the stamp can be easily performed.

Unit for Detecting the position of Recording Sheet

In the present embodiment, as shown in FIG. 1, a recording-sheet sensor 28 is provided as a unit for detecting the position of recording sheet. The recording-sheet sensor 28 comprises a light-emitting device 28a and a photosensor 28b, and is configured so that the sensor 28 is turned off when the recording sheet 17 crosses the optical path of the sensor 28.

Stamping position

An explanation will now be provided of a stamping position on the recording sheet 17, and positions of the stamp 29 and the recording-sheet sensor 28.

As shown in FIG. 1, in the present embodiment, the stamp 29 and the recording-sheet sensor 28 are provided between the pair of conveying rollers 25a and 25b, and the pair of discharging rollers 26a and 26b, so that the stamp 29 is provided at a position downstream from the sensor 28 with respect to the flow of the recording sheet 17.

By arranging the apparatus so that the user can selectably change the amount of conveyance of the recording sheet 17 after the leading end of the recording sheet 17 reaches the sensor 28 to turn off the sensor 28, a stamp can be printed at a position desired by the user between the upper and lower ends of an output image.

Figure 26:
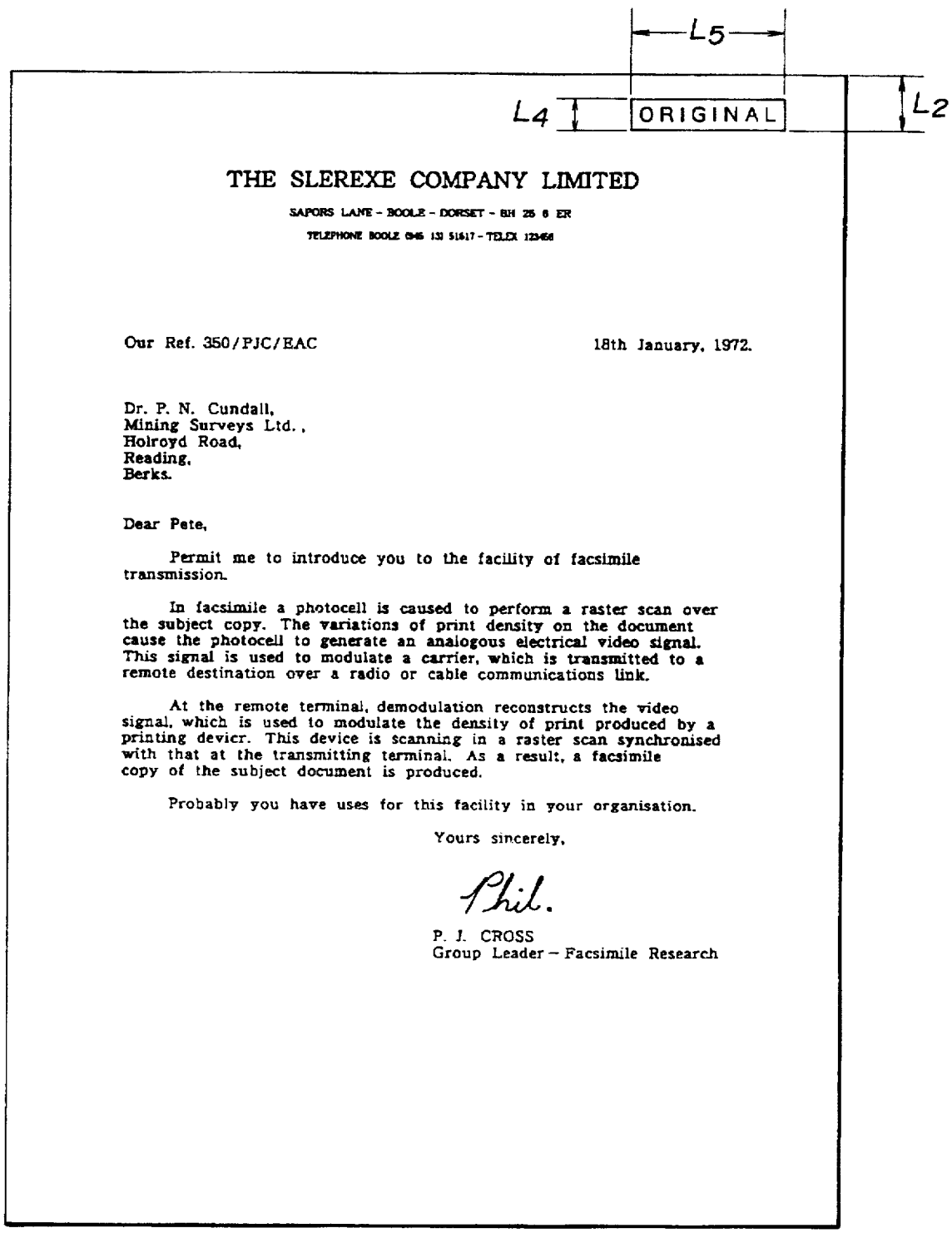

The user performs the setting, for example, by inputting a numerical value from the operation unit D (see FIG. 16). If the motor for driving the recording sheet 17 comprises a stepping motor, the CPU 104 calculates to what steps of the motor the amount of conveyance of the recording sheet 17 input by the user corresponds, and the obtained data is stored in the RAM 106. If the distance between the sensor 28 and the stamp 29 is represented by $L_1$ as indicated in FIG. 1, and if the user desires to print a stamp at a position having a distance $L_2$ from the upper end of the image as indicated in FIG. 26, the recording sheet 17 is conveyed a distance of $(L_1+L_2)$ and is stopped at that position after the sensor 28 has detected the leading end of the recording sheet 17. Subsequently, the solenoid 30 is turned on to print the stamp 29. The recording sheet 17 is then conveyed until it is discharged by the pair of discharging rollers 26a and 26b. Usually, in a laser-beam printer the photosensitive member is rotated at a constant speed, and this process speed is fixed while an image is recorded. Therefore, it is impossible to stop the recording sheet 17 during a recording operation of one page. The recording sheet 17 can be stopped only after it passes through a nip portion between the fixing roller 24a and the pressing roller 24b.

Figure 2:
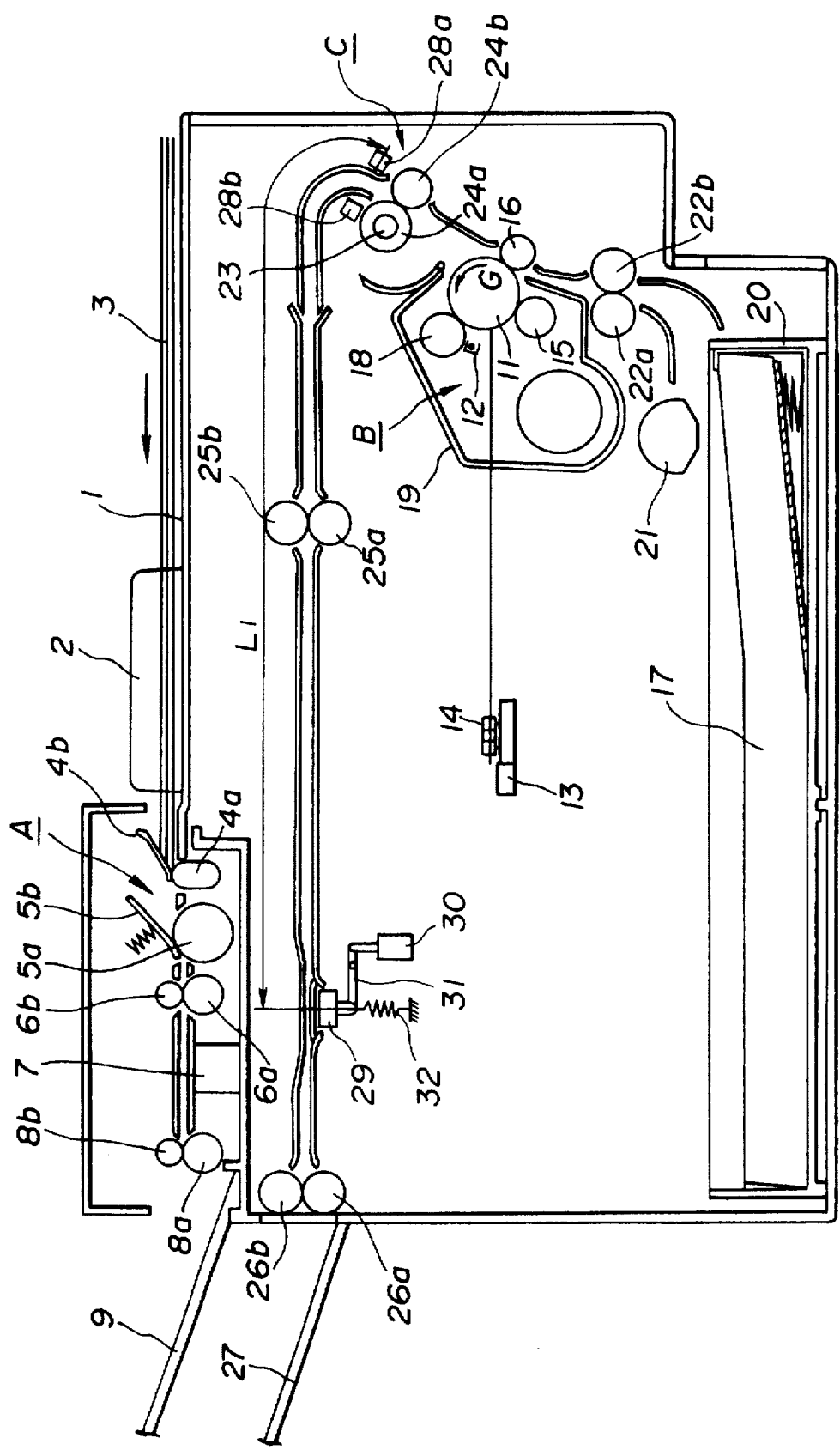
FIG. 2 is a cross-sectional view of a communication apparatus having a different sensor position according to a modification of the embodiment shown in FIG. 1.

Hence, as shown in FIG. 2, a jam sensor, which is usually provided at a position immediately downstream from the fixing unit, for checking whether normal developing, transfer and fixing operations are performed, may be used as the recording-sheet sensor 28 in a stamping operation to detect the leading end of the recording sheet, measure the stamping position, and start a stamping operation after confirming that the rear end of the recording sheet 17 has passed through the fixing unit.

Figure 3:
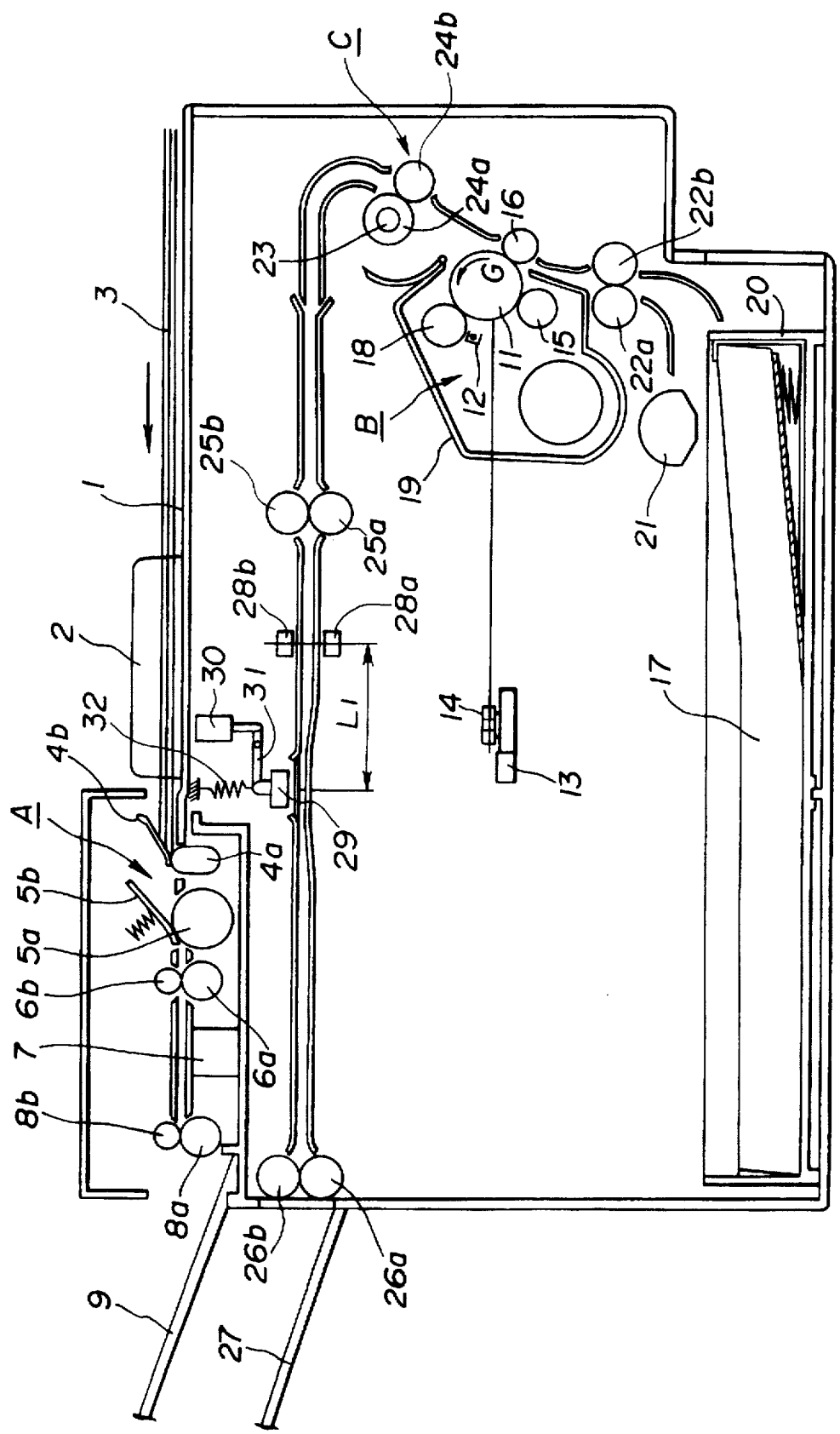
FIG. 3 is a cross-sectional view of a communication apparatus in which a stamp is printed on the back of paper according to another modification of the embodiment shown in FIG. 1.

Furthermore, as shown in FIG. 3, by providing the stamp 29 so as to perform stamping on the back of the recording sheet 17, it is possible to discriminate an original from a copy of the original without contaminating an image recorded on the surface of the sheet. It is also possible to prevent a copy from being added with unnecessary characters.

Figure 4:
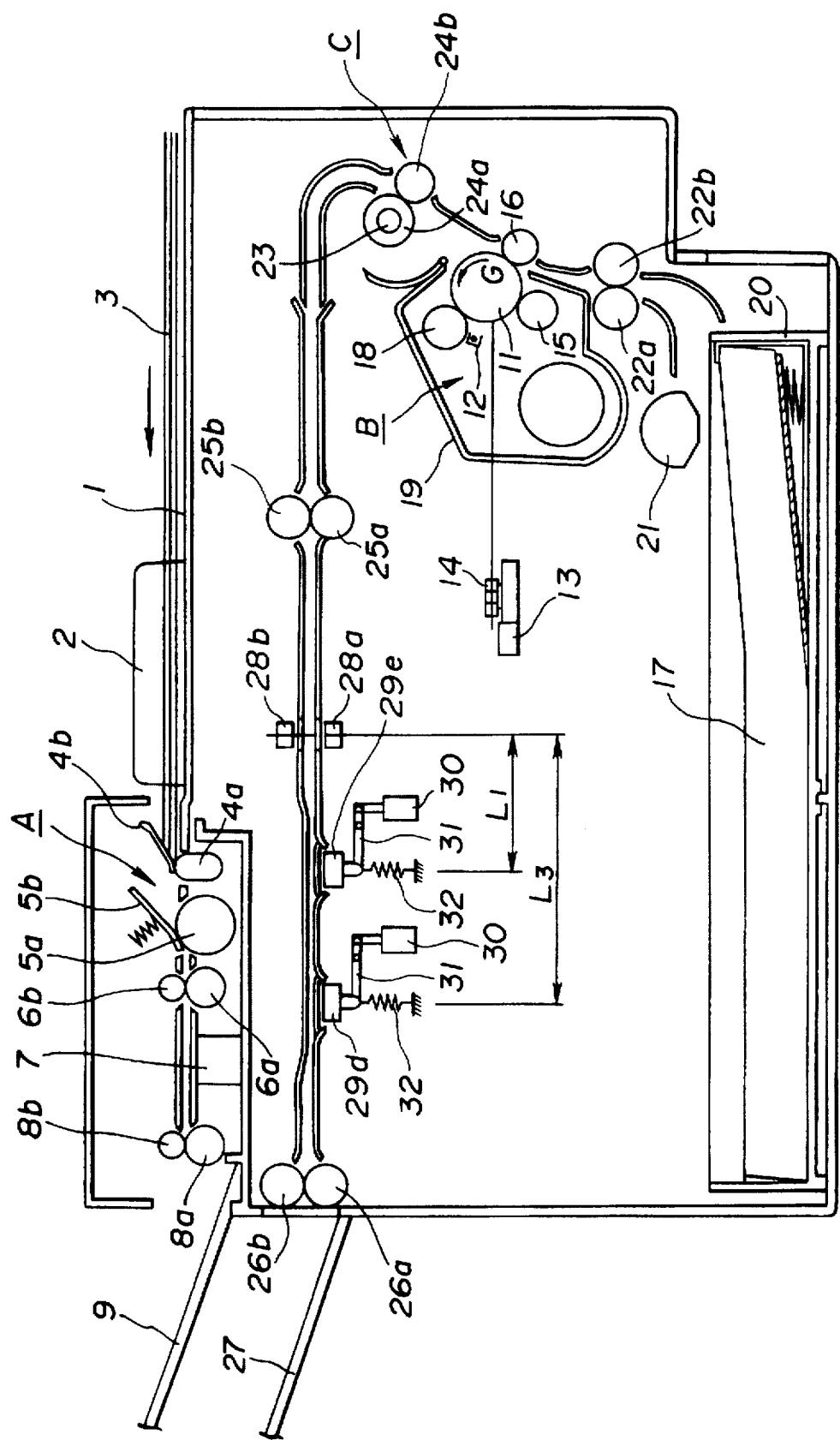
FIG. 4 is a cross-sectional view of a communication apparatrus having two stamps according to still another modification of the embodiment shown in FIG. 1.

Moreover, as shown in FIG. 4, it is also possible to provide a plurality (two in the case of FIG. 4) of stamps and select which stamp is to be used. For example, characters "ORIGINAL", "FILE", "COPY" and the like may be set. The characters "COPY" may be stamped in a copying operation, the characters "FILE" may be stamped on documents to be filed and stored, and the characters "ORIGINAL" may be stamped in other cases.

In the case of FIG. 4, by making the above-described distance of conveyance of the recording sheet 17 to be $(L_2+L_3)$ when a stamp 29d is selected, stamping is performed at a position having a distance $L_2$ from the upper end of the image, as shown in FIG. 26.

The user can also select the stamp to be used from the operation unit D in addition to the stamping position.

Figure 30:
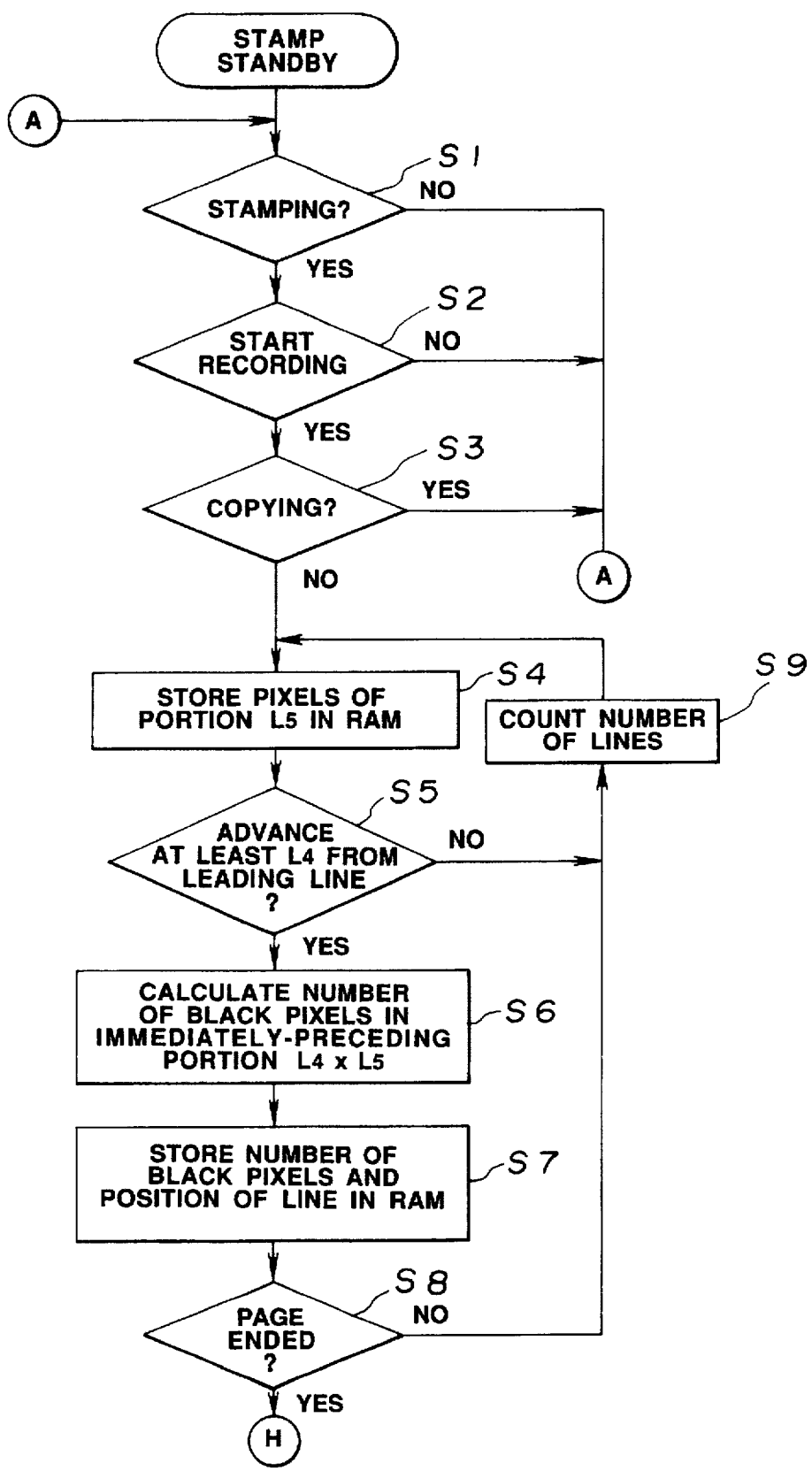
Figure 31:
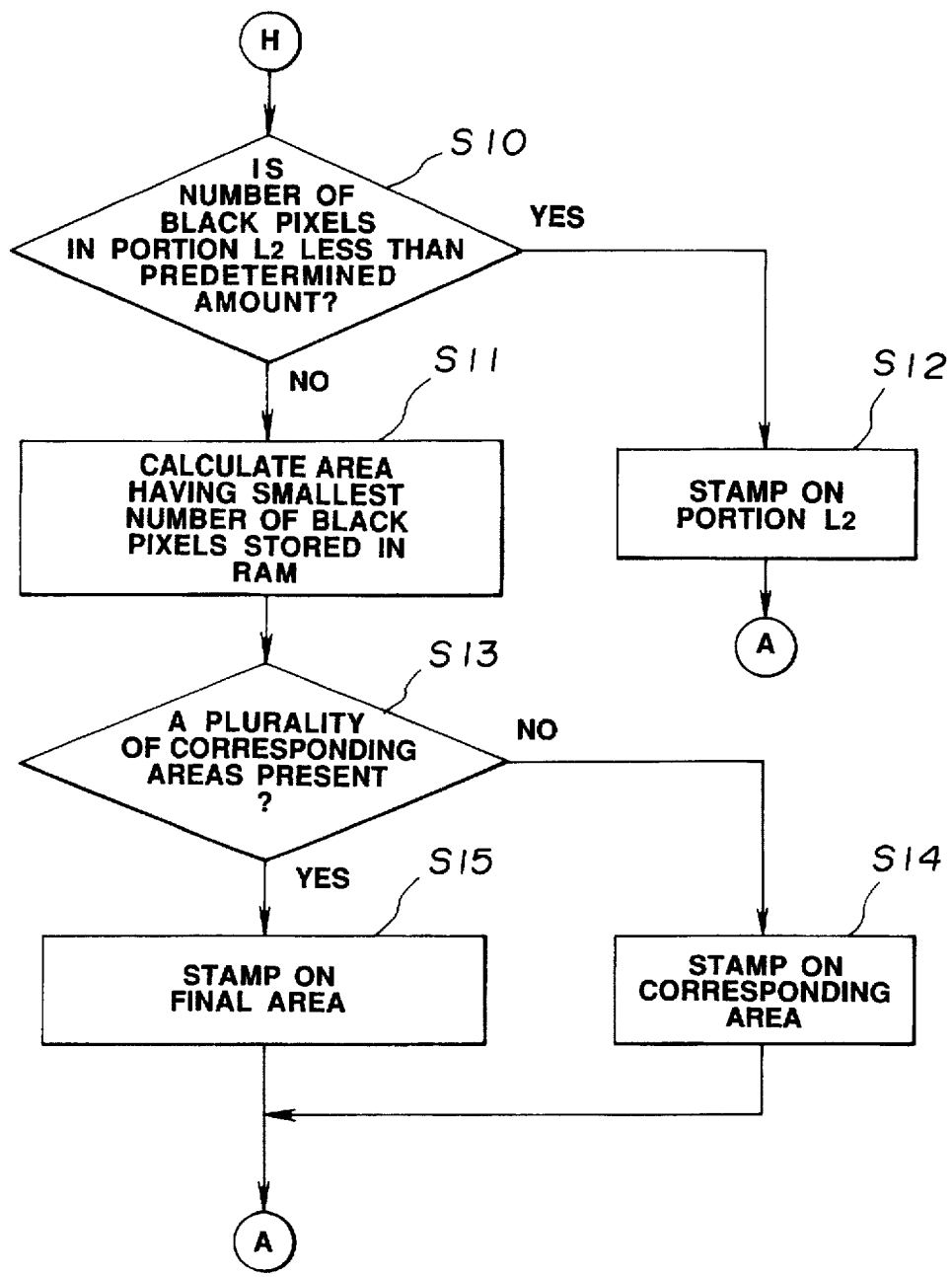

Next, a stamping operation will be explained with reference to the flowcharts shown in FIGS. 30 and 31.

Usually, a stamp standby state is provided, while awaiting the start of recording. First, in step S1, it is determined whether or not stamping is to be performed. The setting of stamping is performed through a registered software switch on the operation unit D.

Figure 29:
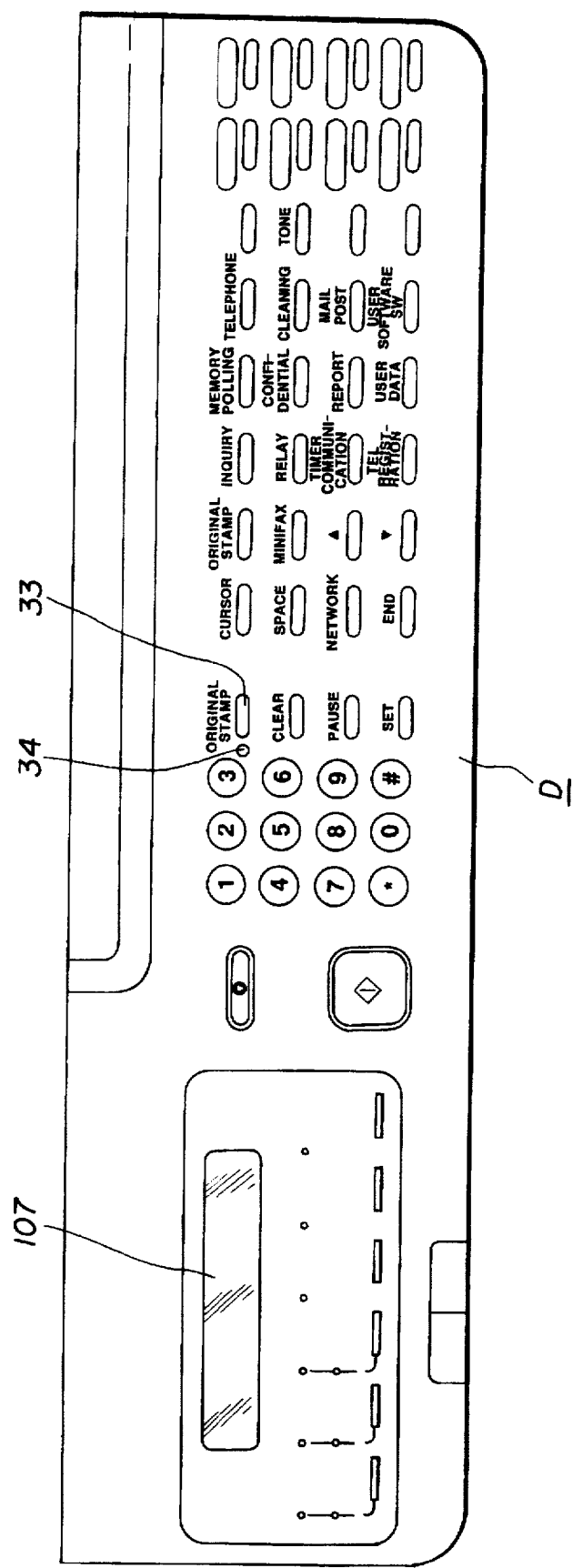
FIG. 29 is a plan view of an external appearance of an operation unit.

FIG. 29 is a plan view of the operation unit D. In FIG. 29, there are shown an "original stamp" key 33, and an LED (light-emitting diode) 34 which turns on and off in accordance with the turning on and off of the original stamp key 33.

When the user desires to perform stamping of the word "ORIGINAL", stamping is performed on a received original by depressing the "original stamp" key 33 (the LED 34 is turned on).

If the user does not desire to stamp the received original, the received original can be obtained as it is by not depressing the key 33 (if the LED 34 is turned on, the LED 34 is turned off by depressing the key 33 again). The user can clearly see which state the apparatus is in by looking at the LED 34. Therefore, there is no possibility of misunderstanding by the user.

If a facsimile apparatus is used as a communication apparatus, it can also be used, in general, as a copier as well. In particular, if a facsimile apparatus which adopts an LBP recording method is used, the same recording sheets as those used in conventional copiers can be used. An LBP facsimile provided with a page memory also has the function of providing a plurality of copies of the same kind.

When a copying operation is performed, the "ORIGINAL" stamp becomes meaningless, or rather unnecessary. Therefore, the apparatus is configured so that the stamp 29 is not printed during a copying operation, but only during reception by the control unit of the CPU 104. If in step 1 it is selected that stamping is not to be performed, shown in FIG. 30, the standby state is continued. If in step 1 it is selected that stamping is to be performed, in step S2 a recording operation is started.

Figure 27:
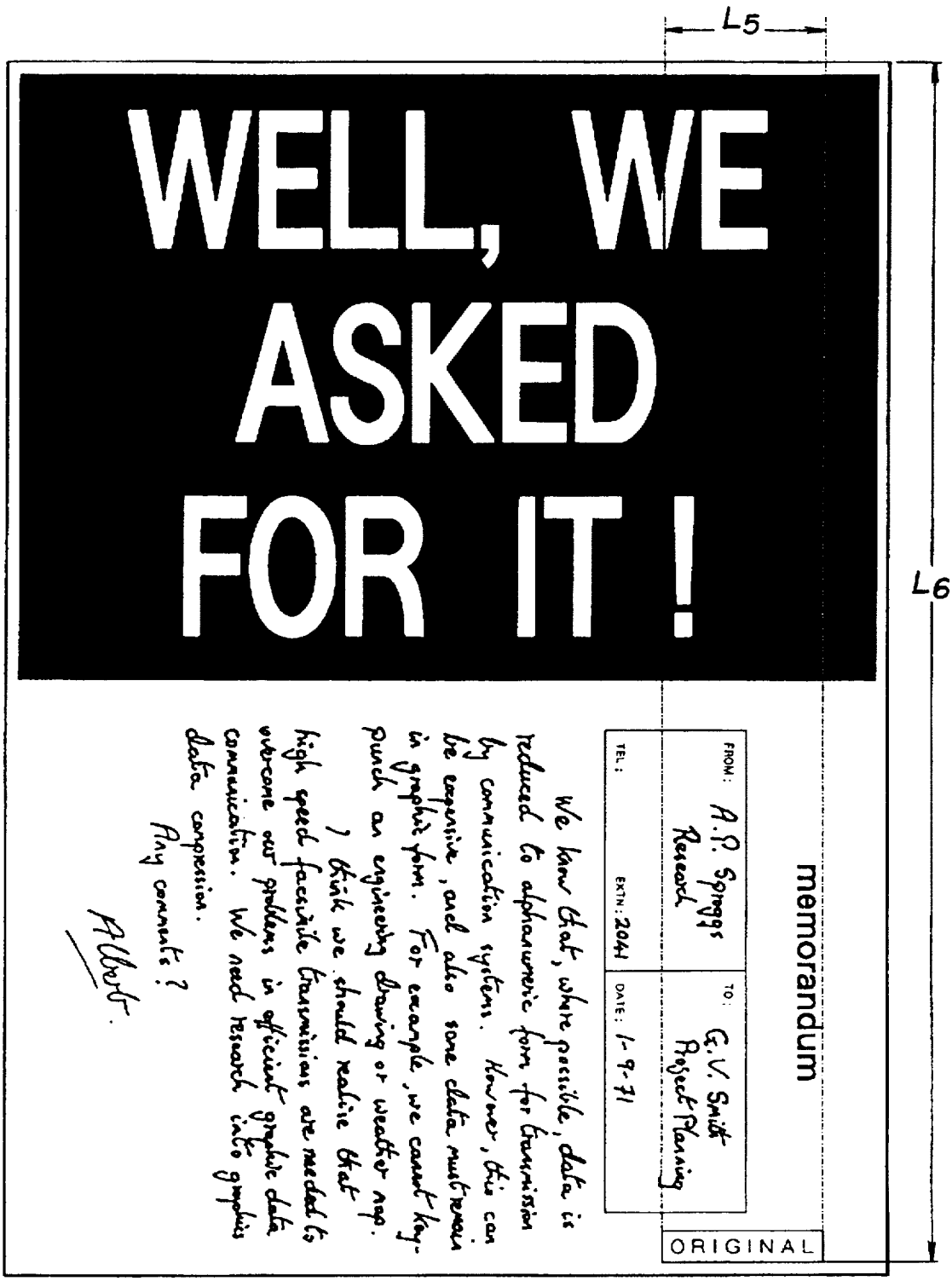

After a recording operation has been started, in step S3 it is determined whether or not a copying operation is to be performed. If the result of the determination is affirmative, stamping is not performed. When a received image is to be recorded, the state of the original is determined in steps following step S4. If a predetermined position is "blackish", stamping is performed at another position. This operation will be described in detail later. If the original comprises an image as shown in FIG. 27, the stamp 29 printed at the position shown in FIG. 26 will not be clearly recognized because the background is entirely blackish. This problem can be overcome by printing the stamp 29 at a position where black pixels (picture elements) are absent or scarce, as shown in FIG. 27.

As described above, the LBP facsimile apparatus includes the buffer memory 102, shown in FIG. 16, for storing image data for one page. Therefore, the CPU 104 recognizes areas where black pixels are present. When the image shown in FIG. 27 has been received, the CPU 104 checks for black pixels in the portion surrounding the position $L_2$ of the stamp set by the user. If the number of black pixels is at least a predetermined amount, stamping at the portion $L_2$ is stopped, and stamping is performed at an area where black pixels are absent or the number of black pixels is smallest. If a plurality of areas containing black pixels are present, stamping is performed at the lowest area (see FIG. 27). If it is assumed that the position determined by the CPU 104 is situated at a distance $L_6$ from the leading end of the image, the recording sheet 17 is conveyed by a distance ($L_1+L_6$) and is stopped at that position after detecting the leading end of the recording sheet 17 by the sensor 28, and the stamp 29 is printed by turning on the solenoid 30. The size of the stamp 29 is assumed to be $L_4 \times L_5$ (see FIG. 26).

First, in step S4 (FIG. 30), pixels present at position L5 shown in FIG. 27 on the first line output in the recording operation are stored in the RAM 106. Thereafter, pixels present at position $L_5$ on the second line are stored in the RAM 106, followed by pixels at position $L_5$ on respective lines, each being sequentially stored in the RAM 106. When it is detected in step S5 that the position of the recording line has advanced at least the width $L_4$ of the stamp, it is determined that the first ($L_4 \times L_5$) area has been recorded. In step S6, the number of black pixels on respective lines within the first ($L_4 \times L_5$) area is calculated to obtain the number of black pixels within the first area, and the obtained number of black pixels and the position of the line are stored in the RAM 106. When recording of the next line has been completed, the number of black pixels within the next ($L_4 \times L_5$) area is calculated, and the calculated number is stored in the RAM 106. This operation is repeated until the end of the page is confirmed in step S8. When the storage of black pixels on all the lines has been completed, data to determine at which position $L_5$, within the page stamping is to be performed, are stored in the RAM 106.

Subsequently, in step S10 (FIG. 31), it is determined whether or not the number of black pixels within the ($L_4 \times L_5$) area at the preset position $L_2$ is less than a predetermined amount. If the result of the determination is affirmative, stamping is performed on the position $L_2$ in step S12. If the result of the determination is negative, in step S11, data of the number of black pixels in respective areas stored in the RAM 106 are compared, and an area having the smallest number of black pixels (the whitest area) is selected. Stamping is then performed on that area in step S14. If a plurality of areas having the smallest number of black pixels are present, the final (i.e., lowest) area is selected, and stamping is performed on that area in step S15. After performing stamping in step S14 or S15, the process returns to the stamp standby state.

In the foregoing explanation, it is assumed that when stamping is performed at a position other than the set position $L_2$, stamping is performed at the final candidate area. However, the present embodiment is not limited to such a rule. For example, stamping may be performed at a portion near the center of the paper, or at the first candidate area.

Alternatively, stamping may be performed at a set position without determining the number of black pixels at the position $L_2$.

Another Embodiment

Figure 5:
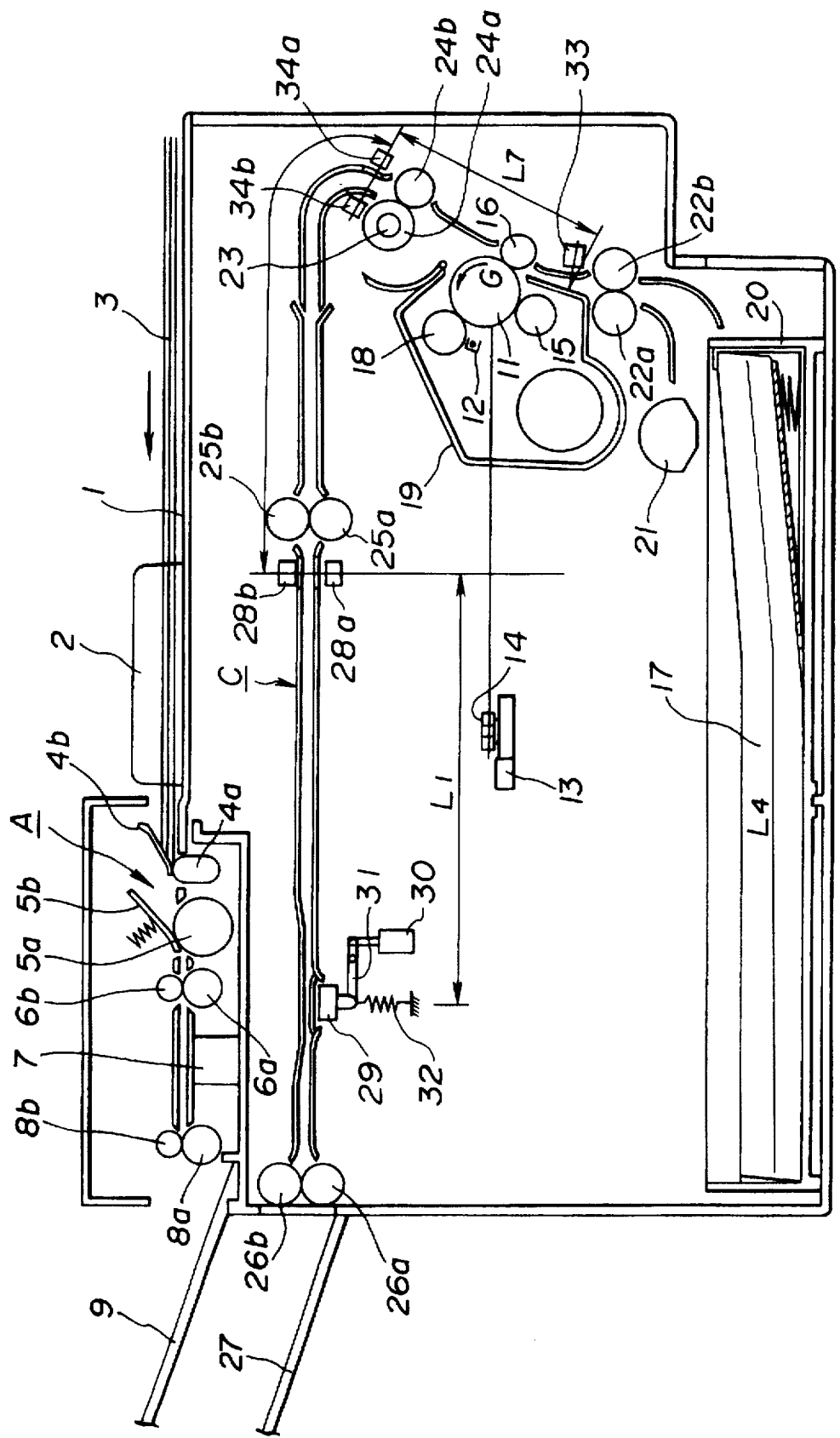
FIG. 5 is a cross-sectional view of a communication apparatus in which recording paper is not stopped during a stamping operation according to another embodiment of the present invention.

In another embodiment, a method in which the operation of a recording unit is not stopped for a stamping operation will be shown. FIG. 5 is a cross-sectional view illustrating the entire apparatus of the embodiment. In FIG. 5, the same components as those shown in FIGS. 1 through 4 are indicated by the same reference numerals.

In FIG. 5, a paper-detecting sensor (a reflective photo-interrupter type) 33 is provided at a position downstream from the pair of driving rollers 22a and 22b. The sensor 33 is turned on when the recording sheet 17 passes through it. A paper-detecting sensor 34 (comprising a light-emitting device 34a and a photosensor 34b) is provided at a portion downstream from the pair of fixing rollers 24a and 24b. The sensor 34 is turned off when the recording sheet 17 passes through the optical path of the sensor 34. A recording-paper-detecting sensor 28, comprising a light-emitting device 28a and a photosensor 28b, is provided immediately after the pair of conveying rollers 25a and 25b.

Usually, in an electrophotographic facsimile apparatus, developing and fixing operations are performed at a constant speed, and the recording sheet is not stopped during a recording operation of one sheet. On the other hand, it is desirable to stop the recording sheet 17 when the stamp 29 is printed. Furthermore, in facsimile apparatuses, communication speed has increased for the purpose of reducing communication cost. Hence, in the case of continuous reception, the time of stoppage of the recording unit is short, and the timing of the stoppage is defined. That is, the recording unit cannot be stopped for a long time for the purpose of printing the stamp 29.

Accordingly, switching units (not shown), such as electromagnetic clutches or the like, which can turn on and off the drive of the pair of conveying rollers 25a and 25b, and the pair of discharging rollers 26a and 26b, are provided for the respective pairs of rollers. It is thereby possible to print the stamp 29 by stopping the recording sheet 17, for which a fixing operation has been completed, irrespective of the drive/stoppage of the recording unit.

When continuous reception is performed, recording of the immediately next page is started after the rear end of the immediately preceding recording sheet has passed through the sensor 34. Therefore, if it is assumed that the leading end of the next recording sheet waits at the position of the sensor 33, the interval between the recording sheets becomes $L_7$.

If the apparatus is arranged such that the succeeding recording sheet cannot reach the preceding recording sheet while the stamp 29 is printed, i.e., while the drive of the pair of conveying rollers 25a and 25b, and the pair of discharging rollers 26a and 26b is turned off by the clutches, paper jamming or the like will never occur. For that purpose, the following expression must be satisfied:

$V \times T < L_7$, where T represents the time of stoppage of the recording sheet, and V represents the conveying speed of the recording sheet.

Figure 32:
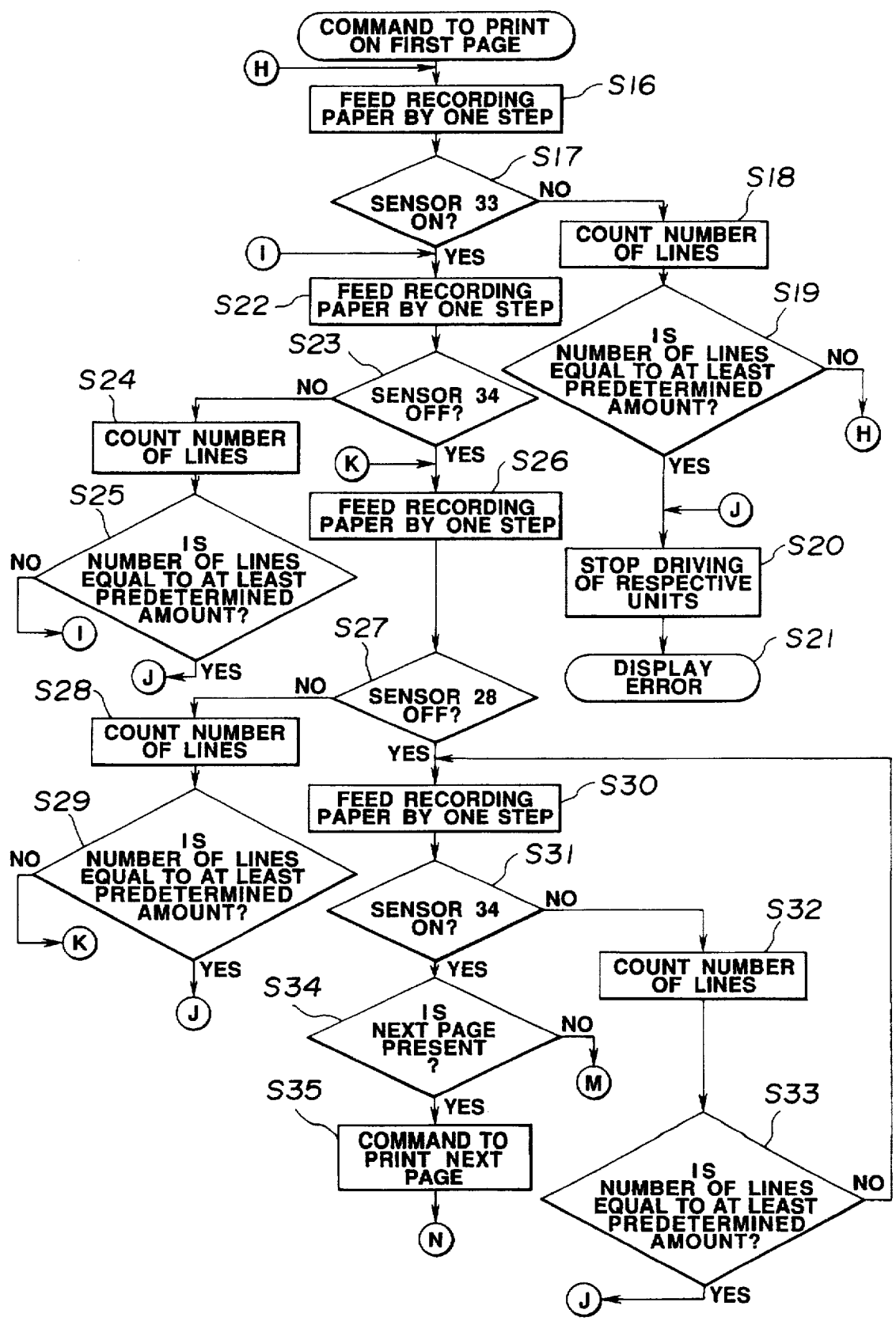

Next, the operation of conveying a recording sheet will be explained with reference to FIGS. 32 and 33.

When a print command has been input, in step S16, conveyance of a recording sheet from the recording-sheet cassette 20 (see FIG. 5) is started. In step S17, it is detected whether or not the recording sheet has been conveyed to the position of the sensor 33. If the number of lines counted in step S18 exceeds a predetermined amount in step S19, it is determined that the recording sheet is not conveyed to the recording unit. The drive of the respective units is stopped in step S20, and error is displayed in step S21.

If the apparatus has detected that the recording sheet has been conveyed to the position of the sensor 33 in step S17, conveyance of the recording sheet for recording an image is started in step S22. In step S23, it is monitored whether or not the recording sheet has been conveyed to the position of the sensor 34. If the number of lines counted in step S24 equals at least the predetermined amount in step S25, it is determined that paper jamming has occurred in the recording unit. The drive of the respective units is stopped in step S20, and error is displayed in step S21.

If the apparatus has detected that the recording sheet has been conveyed to the position of the sensor 34 in step S23, it is checked whether or not the recording sheet has been conveyed to the position of the sensor 28 in step S27 while monitoring paper jamming in steps S28 and S29. It is then confirmed that the rear end of the recording sheet has passed through the fixing rollers while monitoring paper jamming in steps S32 and S33. If the next page is present in step S34, a command to print the next page is output in step S35.

In step S37, FIG. 33, the recording sheet is conveyed to the stamping position (the position where the recording sheet is conveyed by a distance ($L_1+L_2$) after the leading end of the recording sheet has passed the position of the sensor 28). In step S38, stamping is performed while turning off the clutches of the pair of conveying rollers 25a and 25b, and the pair of discharging rollers 26a and 26b. In step S40, the clutches of the pair of conveying rollers 25a and 25b and the pair of discharging rollers 26a and 26b are turned on to discharge the recording sheet.

In step S41, it is checked whether or not the stamped recording sheet corresponds to the final page. If the result of the check is negative, it is detected in steps S42 and S43 where the next recording sheet has reached, and a predetermined operation is repeated in accordance with the detected position. If the result of the check in step S41 is affirmative, in step S44, the final recording sheet is conveyed until it is discharged.

The apparatus is controlled such that the clutches of either the pair of conveying rollers 25a and 25b, or the pair of discharging rollers 26a and 26b (not both pairs) are turned off depending on the length of the recording sheet and the stamping position, and stamping is performed at a predetermined position.

Figure 6:
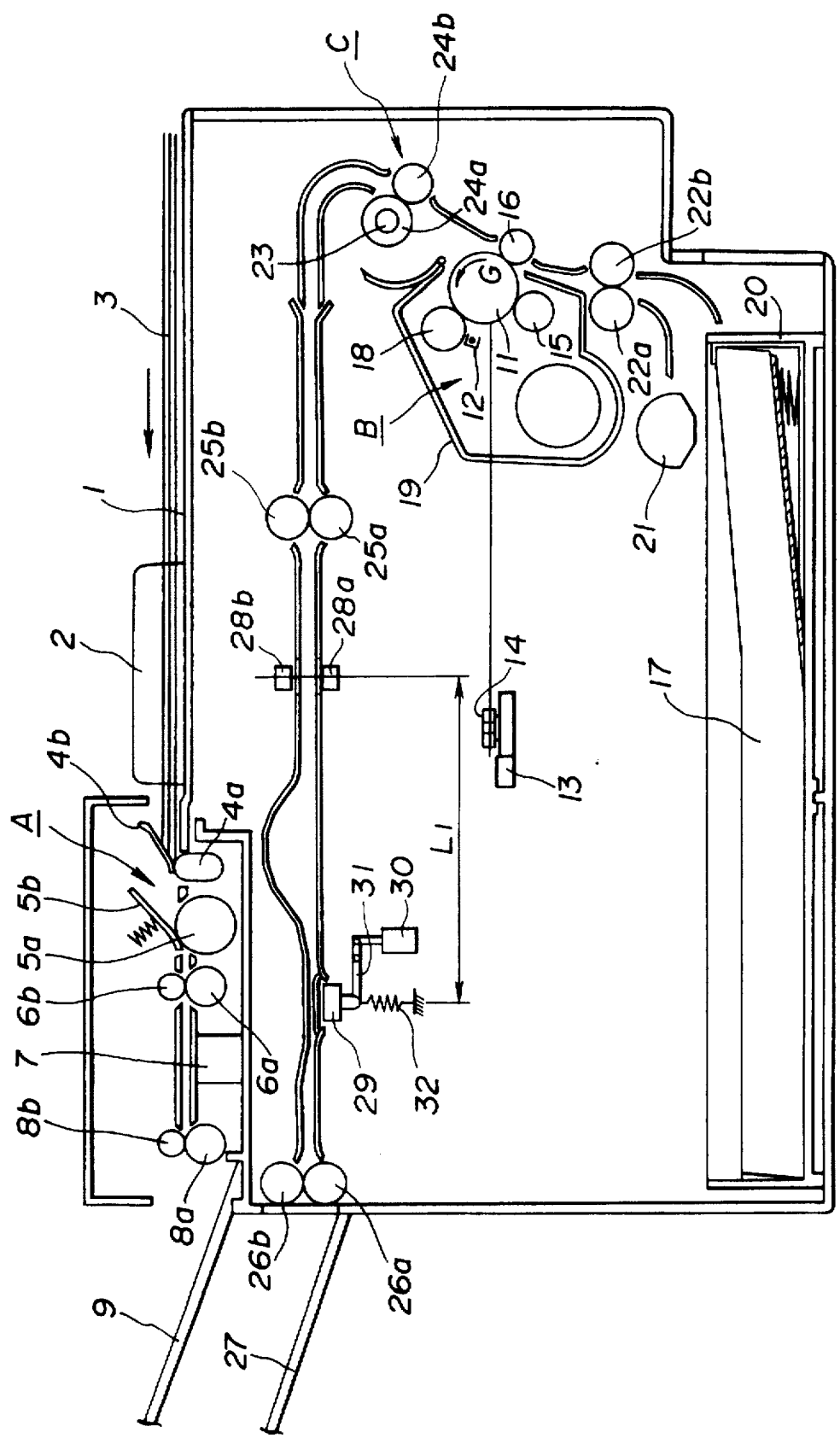
FIG. 6 is a cross-sectional view of a communication apparatus in which recording paper is not stopped during a stamping operation according to a modification of the embodiment shown in FIG. 5.

FIG. 6 shows another unit which performs stamping without stopping the recording unit.

Figure 7:
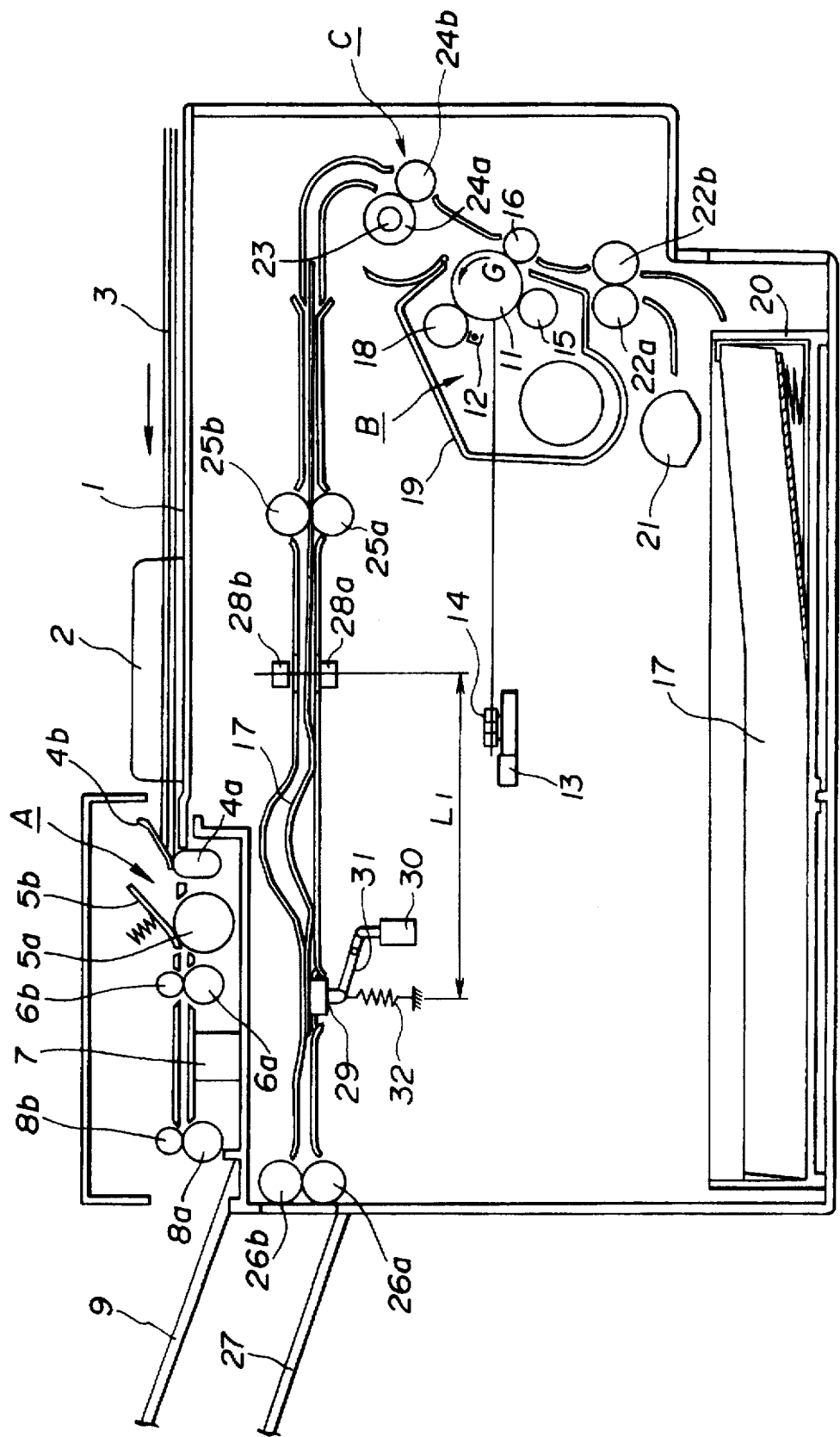
FIG. 7 is a diagram illustrating a stamping operation.

By partially increasing the length of the conveying path between the stamp 29 and the pair of conveying rollers 25a and 25b, a space for receiving the recording sheet when it sags is provided (see FIG. 6). If the stamp 29 prints during conveyance of the recording sheet 17, the stamped portion is stopped during the stamping operation. Hence, a sag is produced in the recording sheet 17 between the stamp 29 and the pair of conveying rollers 25a and 25b. By securing the space shown in FIG. 6, the recording sheet 17 sags in a natural manner, whereby paper jamming can be prevented. FIG. 7 shows the instant of printing by the stamp 29.

Next, an explanation will be provided of still another unit having a roller-like shape which can perform stamping without stopping the recording unit.

Figure 8:
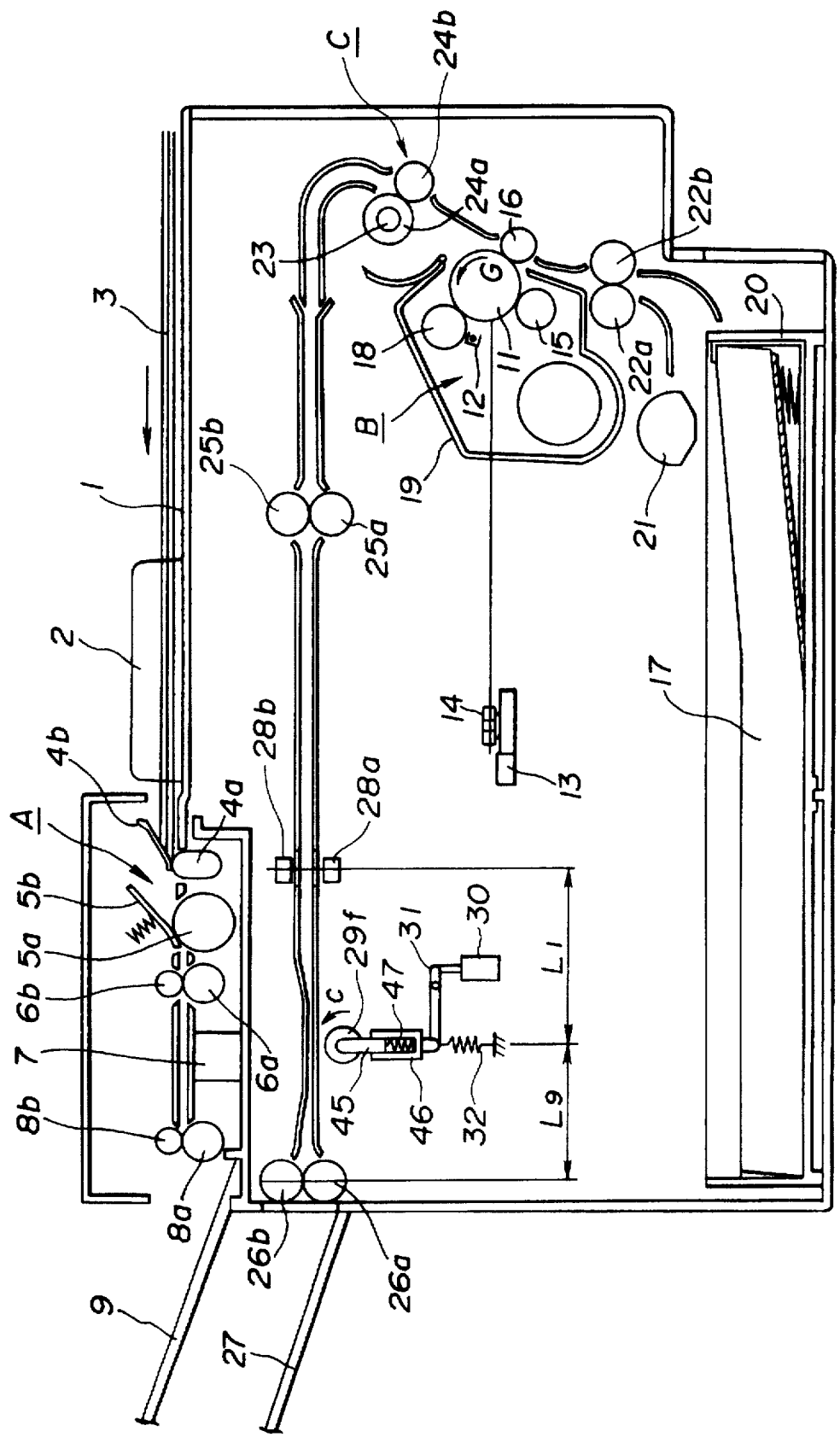
FIG. 8 is a cross-sectional view of a communication apparatus having a roller-type stamp according to a modification of the embodiment shown in FIG. 5.
Figure 20:
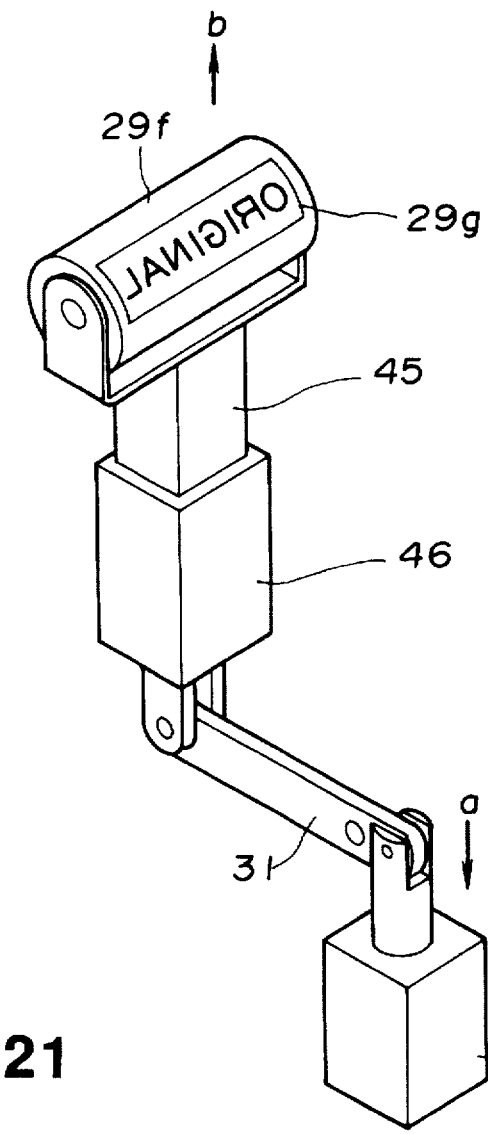
FIG. 20 is a perspective view of a roller-type stamping unit.

In FIG. 8, a stamp 29f, having a roller-like shape and provided with a printing member on its outer circumference, is pivoted on a supporting member 45 at a portion downstream from the sensor 28. The supporting member 45 is slidably disposed on a guide member 46, and incorporates a compression spring 47 so that an appropriate pressure is applied to the recording sheet 17 during a stamping operation. A solenoid 30 and a member 31 connected thereto are provided so as to press the stamp 29f against the recording sheet 17. A spring 32 downwardly retracts the stamp 29f in a standby state. FIG. 20 is a perspective view of the stamping unit (the springs 32 and 47 are omitted).

Figure 21:
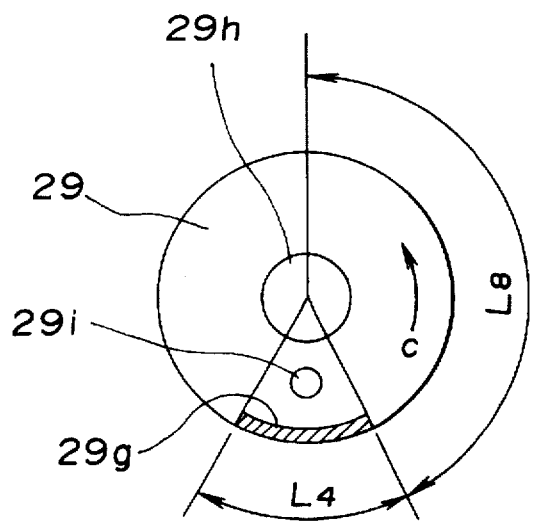
FIG. 21 is a cross-sectional view of the roller-type stamping unit shown in FIG. 20.

FIG. 21 is a cross-sectional view of the stamp 29f. A weight 29i is disposed between a portion 29g (having a width of $L_4$) including characters, such as "ORIGINAL" or the like, and a shaft 29h. The printing portion 29g is set so as to face downward by its own weight. The circumferential length from the upper apex and the printing portion 29g is represented by $L_5$.

In FIG. 20, if the solenoid 30 is turned on, the shaft is driven in the direction "a" to move the guide member 46, the supporting member 45 and the stamp 29f in the direction b via the member 31, whereby the stamp 29f is pressed against the recording sheet 17. The stamp 29f rotates in the direction c (see FIG. 21) in accordance with the conveyance of the recording sheet 17. When the stamp 29f has rotated by a distance ($L_4+L_8$), stamping is terminated by pressing the printing portion 29g against the recording sheet 17. However, a little extra distance is provided, and the unit is set to return to a standby state by turning off the drive of the solenoid 30 after the stamp 29f has rotated by a distance $(L_4+L_8+\alpha)$.

If the distance between the sensor 28 and the stamp 29f is represented by $L_1$ as shown in FIG. 8, and it is desired to perform stamping at the position shown in FIG. 26, after detecting the leading end of the recording sheet 17 by the sensor 28, the solenoid 30 is turned on when the recording sheet 17 has been conveyed by a distance $(L_1+L_2-L_4-L_8)$ to press the stamp 29f against the recording sheet 17, and the recording sheet is conveyed until it is discharged by the pair of discharging rollers 26a and 26b. Since the conveyance of the recording sheet 17 is performed by the pair of discharging rollers 26a and 26b while the stamp 29f is pressed against the recording sheet 17, the stamp 29f cannot be pressed against the recording sheet 17 until the recording sheet 17 is grasped by the pair of discharging rollers 26a and 26b. If the distance between the stamp 29f and the pair of discharging rollers 26a and 26b is represented by $L_9$ as shown in FIG. 8, the apparatus is controlled such that the stamp 29f starts to press against the recording sheet 17 after the leading end of the recording sheet 17 has been detected by the sensor 28 and subsequently conveyed by a distance of at least $(L_1+L_9)$.

Although in the unit shown in FIG. 8, the spring 47 is provided in order to adjust the pressing force of the stamp 29f, the same effect may be obtained by selecting, for example, a rubber having a low hardness as the material of the stamp 29f, or by any other appropriate approach.

Although the stamp 29f is arranged to rotate in accordance with the conveyance of the recording sheet 17, the driving force for the stamp 29f may be provided on its shaft so that the stamp 29f is rotated in synchronization with the conveyance of the recording sheet 17.

Next, an explanation will be provided of another modification of the apparatus shown in FIG. 5 in which the stamp 29 is provided outside the pair of discharging rollers 26a and 26b.

Figure 9:
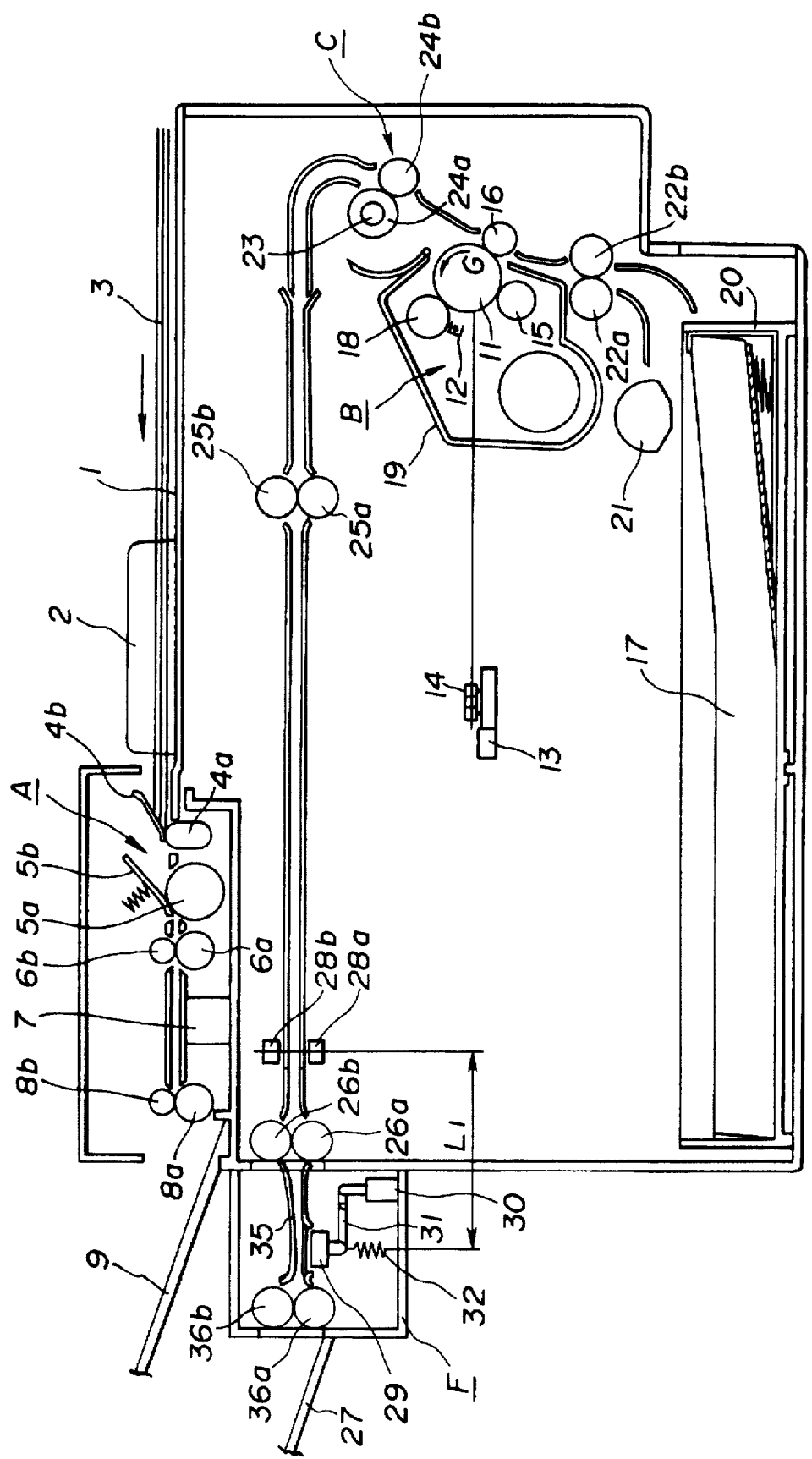
FIG. 9 is a cross-sectional view of a communication apparatus having a stamping unit outside the apparatus according to another modification of the embodiment shown in FIG. 5.
Figure 17:
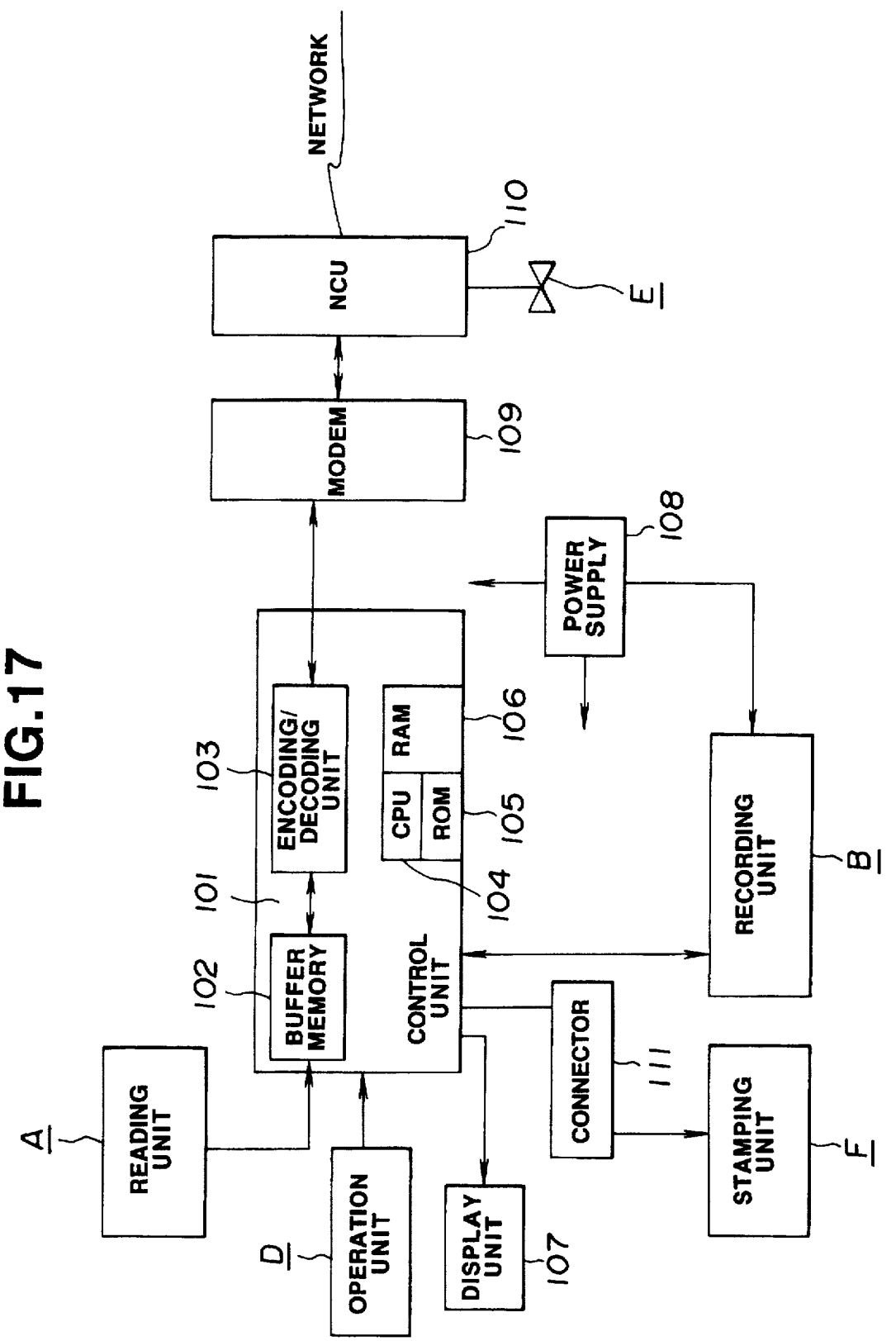
FIG. 17 is a block diagram of the communication apparatus shown in FIG. 9.

As shown in FIG. 9, a stamping unit F is provided as a detachable unit at a portion downstream from the pair of discharging rollers 26a and 26b. This configuration includes a connector 111 for connecting the stamping unit F to the main body of the apparatus, as shown in FIG. 17.

At a portion where the stamping unit F is mounted on the main body of the apparatus, there is provided an output port for a control-line connector for turning on and off the solenoid 30, and a driving line for driving the pair of discharging rollers 26a and 26b. Hence, the stamping unit F can easily mounted if the user so desires.

If however the user does not desire to mount the stamping unit F, since the output port for the connector and the driving line is exposed outside the apparatus, it is necessary to protect the output port by a cover (not shown).

Next, the configuration of the stamping unit F will be explained with reference to FIG. 9.

The stamping unit F incorporates a stamp 29, a solenoid 30, a member 31, a spring 32, a discharging path 35, and a pair of discharging rollers 36a and 36b.

Although in the above-described configuration, an explanation has been provided such that the discharging rollers 36a and 36b of the stamping unit F are driven from the side of the main body of the apparatus provided with the driving line, the discharging rollers 36a and 36b may, of course, be driven by adding a decicated motor within the stamping unit F.

Figure 10:
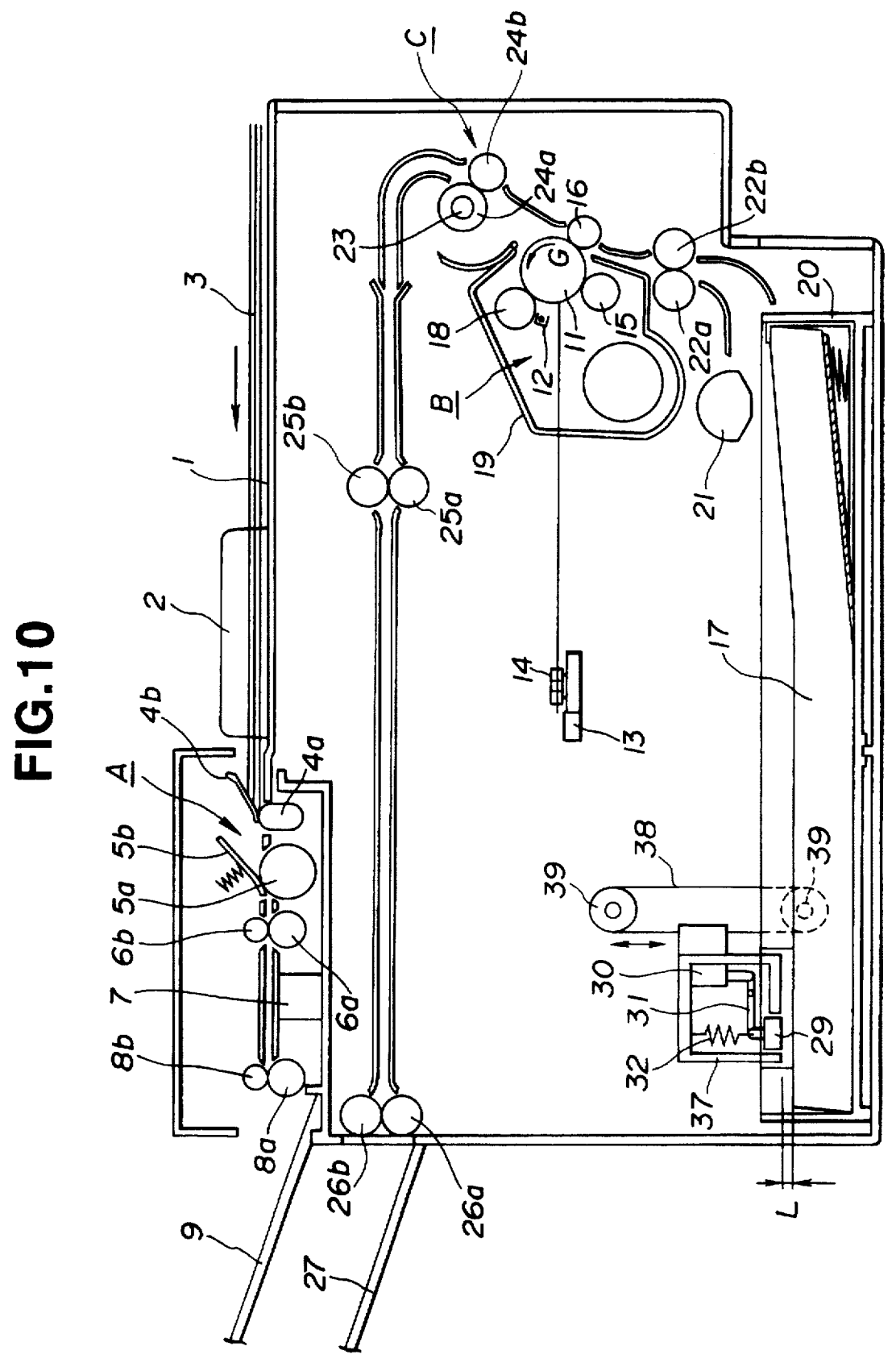

Next, an explanation will be provided of a case in which stamping is performed on a recording sheet within the recording cassette with reference to FIG. 10.

Above the cassette 20, there are provided the stamp 29, the solenoid 30 for pressing the stamp 29 against the recording sheet 17, the member for connecting the solenoid 30 to the stamp 29, the spring 32 for upwardly retracting the stamp 29 in a standby state, a holding mount 37 for holding these components, a vertically-moving wire 38 configured so as to raise or lower the holding mount 37, and a pulley 39 for transmitting the driving force to the wire 38. The holding mount 37 is moved so that the distance L between the surface of the uppermost recording sheet 17 and the stamp 29 is always constant. Such a control can be performed by detecting the height of the surface of the uppermost recording sheet using an actuator (not shown) contacting the surface. When the cassette 20 is detached from the main body of the apparatus in order to replenish the recording sheets 17, it is desirable that the holding mount 37 is raised to the upper end. Since a sensor for detecting the presence/absence of the cassette 20 is usually provided in the apparatus, the apparatus may be arranged so that the holding mount 37 is raised to the upper end if the absence of the cassette 20 is detected by the sensor.

Although in the foregoing explanation, the apparatus is controlled so that the distance L between the stamp 29 and the surface of the uppermost recording sheet 17 is constant, the height of the holding mount 37 may be fixed, for example, while increasing the stroke of the stamp 29.

Next, an explanation will be provided of a case in which a discharging roller also functions as a stamp.

Figure 24:
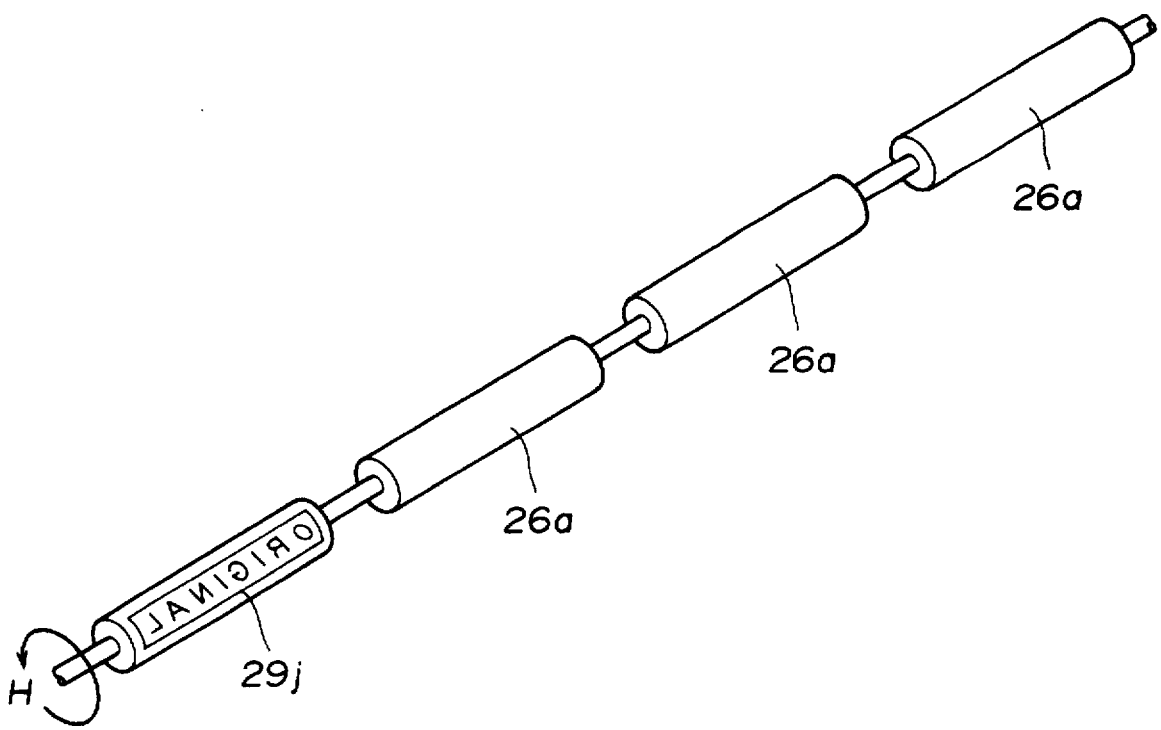
FIG. 24 is a perspective view of a stamping unit in which a paper-discharging roller is used as a stamp.

As shown in FIG. 24, one of the rubber members of the discharging roller 26a at the front side is replaced by a stamping roller 29j. By making the outer diameter of the stamping roller 29j equal to the outer diameter of the rubber members of the discharging roller 26a, the stamping roller 29j can also be used as a conveying roller. The discharging roller 26a and the stamping roller 29j are driven in the direction of arrow H. The recording sheet 17 is conveyed by the roller 26a and the rollers 26b in pressure contact therewith. The stamping roller 29j includes a stamp which can perform continuous stamping. Stamping is performed on the recording sheet 17, as shown in FIG. 28.

Although in the above-described configuration, one of the rubber members of the discharging roller 26a is made to be a stamping roller, the present embodiment is not limited to such an approach. For example, one of rubber members of the conveying roller 25a or other roller may be used as a stamping roller.

Although, as shown in FIG. 28, the stamp "ORIGINAL" is printed at the right side of the image (at the front side of the discharging rollers), the position in the horizontal direction, the size, the shape, the typeface and the word of the stamp are, of course, not limited to the illustrated example.

Although four rubber members are provided in the discharging roller 26a, the discharging roller 26a may consist of only one long rubber member.

The above-described approach also has the advantage that since the stamp is provided in the discharging roller, ink can be easily replenished when it is used up after performing stamping on a large number of sheets.

Moreover, the above-described approach also has the advantages that since the above-described effects can be obtained without individually providing a stamping member and a driving source for the member, the production cost can be reduced, the space is not increased, and it is unnecessary to increase the size of the apparatus.

Next, an explanation will be provided of an apparatus provided with a unit which records a stamp image using an ink-jet recording head.

Figure 11:
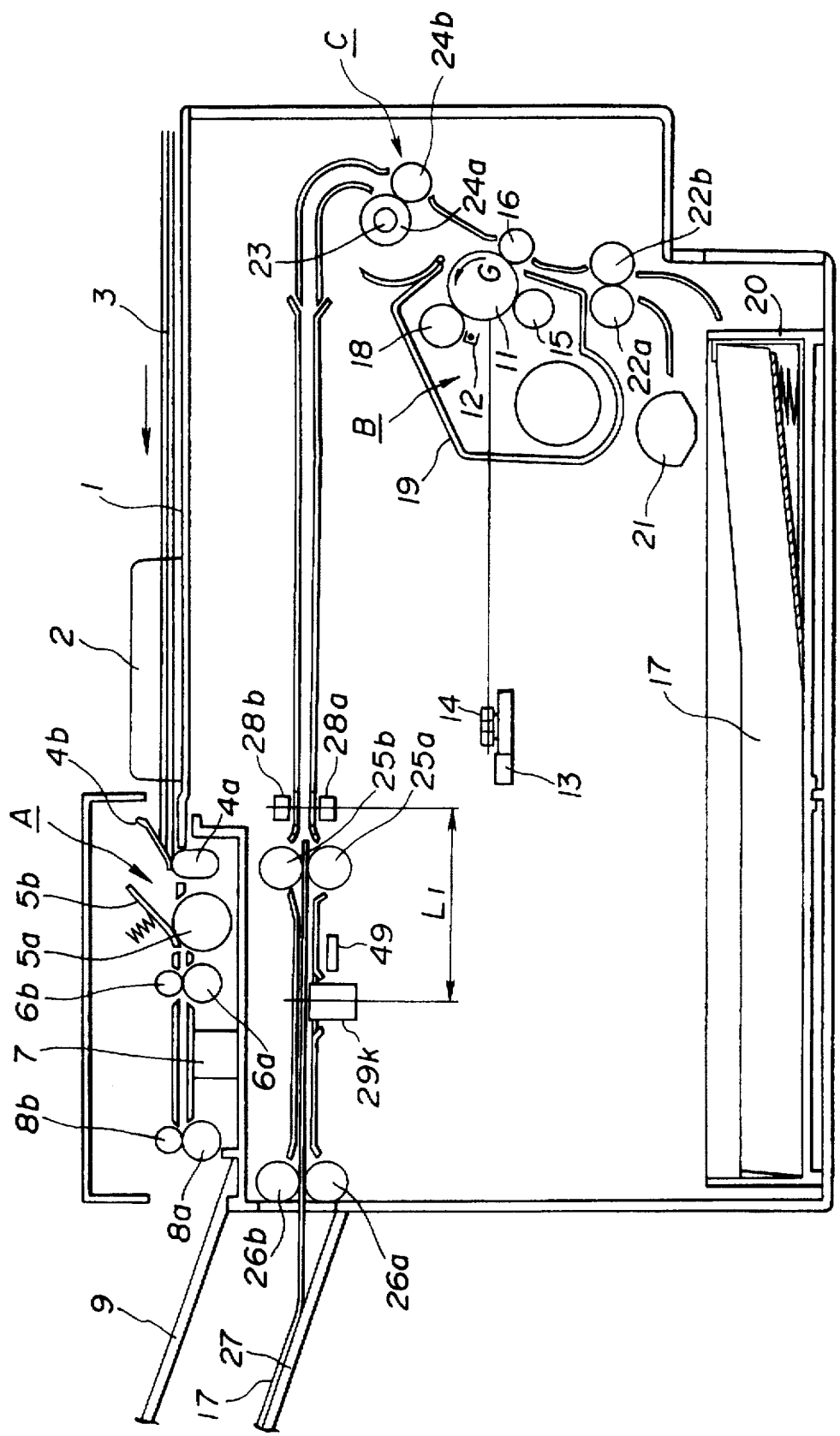
FIGS. 11 and 12 are cross-sectional views of a communication apparatus in which a stamp image is recorded using an ink-jet head according to still another embodiment of the present invention.
Figure 12:
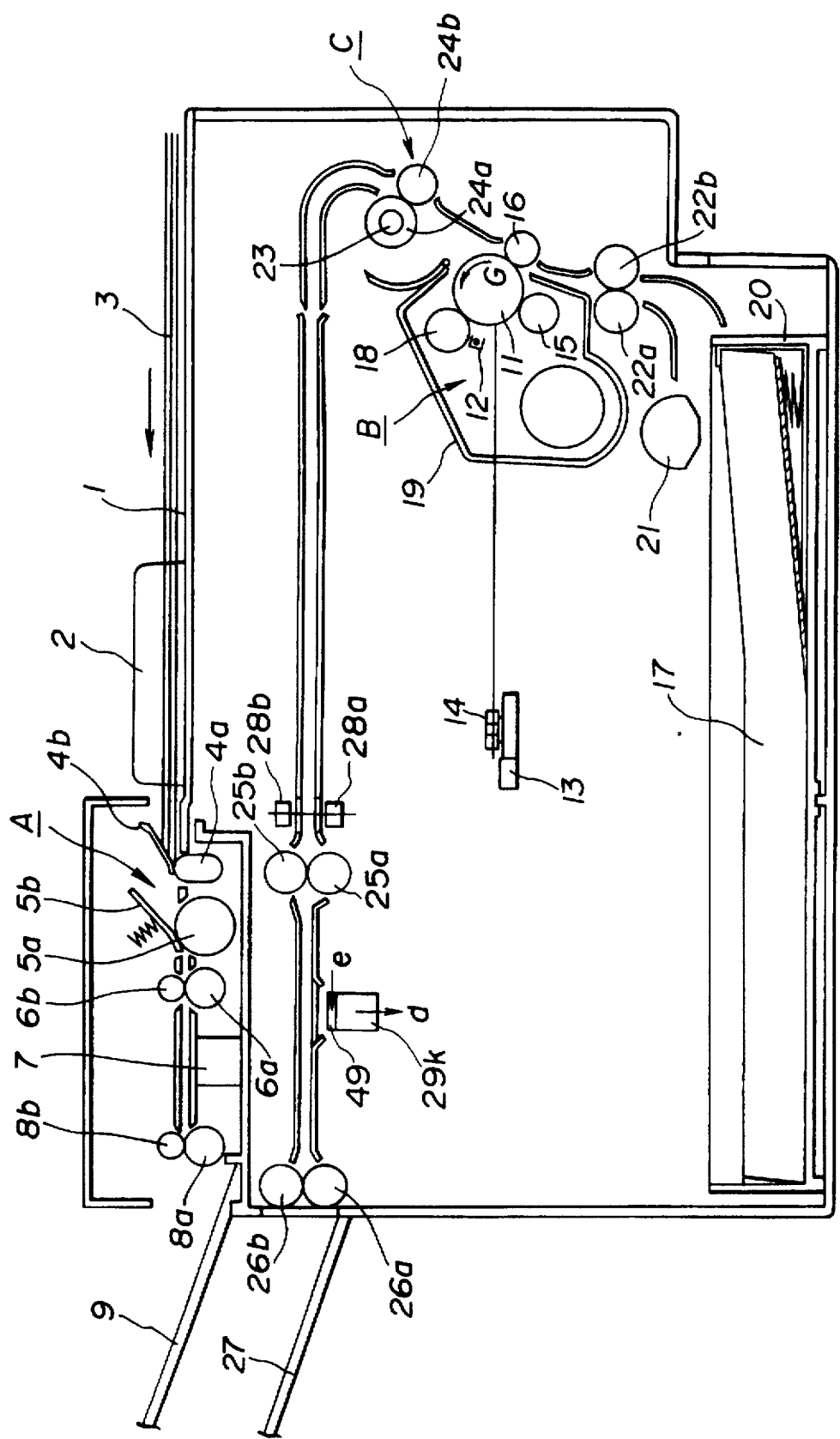
Figure 25:
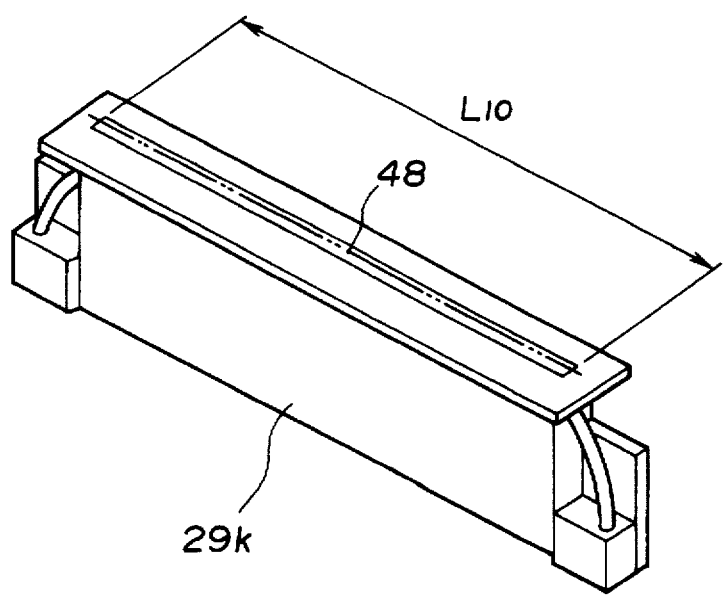
FIG. 25 is a perspective view of an ink-jet recording head.

As shown in FIG. 11, a line-type ink-jet recording head 29k is provided between the pair of conveying rollers 25a and 25b and the pair of discharging rollers 26a and 26b, so as to have a gap of a predetermined amount with the recording sheet 17 held between the pairs of rollers. FIG. 25 is a perspective view of the recording head 29k. As shown in FIG. 12, when ink is not discharged, the recording head 29k is driven in the direction of arrow d by a driving mechanism (not shown), and a cap 49 is driven in the direction of arrow e so as to be in close contact with the nozzle 48 (shown in FIG. 25) in order that a plurality of nozzles 48 disposed at an ink-discharging outlet of the recording head 29k are not clogged by being dried.

When a driving command has been received from the CPU 104, the recording head 29k moves to the state shown in FIG. 11. Subsequently, the driving head 29k discharges ink in accordance with printing data stored in the ROM 105 or the RAM 106, to perform image recording of a word "ORIGINAL" or the like. The image of a word to be recorded may be selected from preset plural samples by the user. Alternatively, the user may form a new image and input the data of the new image in the RAM 106.

Although in the foregoing explanation, a cap 49 is used in order to prevent the nozzle 48 from being dried, any other approach may also be adopted.

The width of the recording head 29k is not limited to $L_{10}$ shown in FIG. 25, but may have the size equal to or less than the maximum recording width of the recording unit B.

Although in the above-described embodiment, a line-type head is used as the recording head 29k, a serial head mounted on a carriage so as to be reciprocatable in the main scanning direction (a direction orthogonal to the sheetfeeding direction) may, of course, be used.

Figure 13:
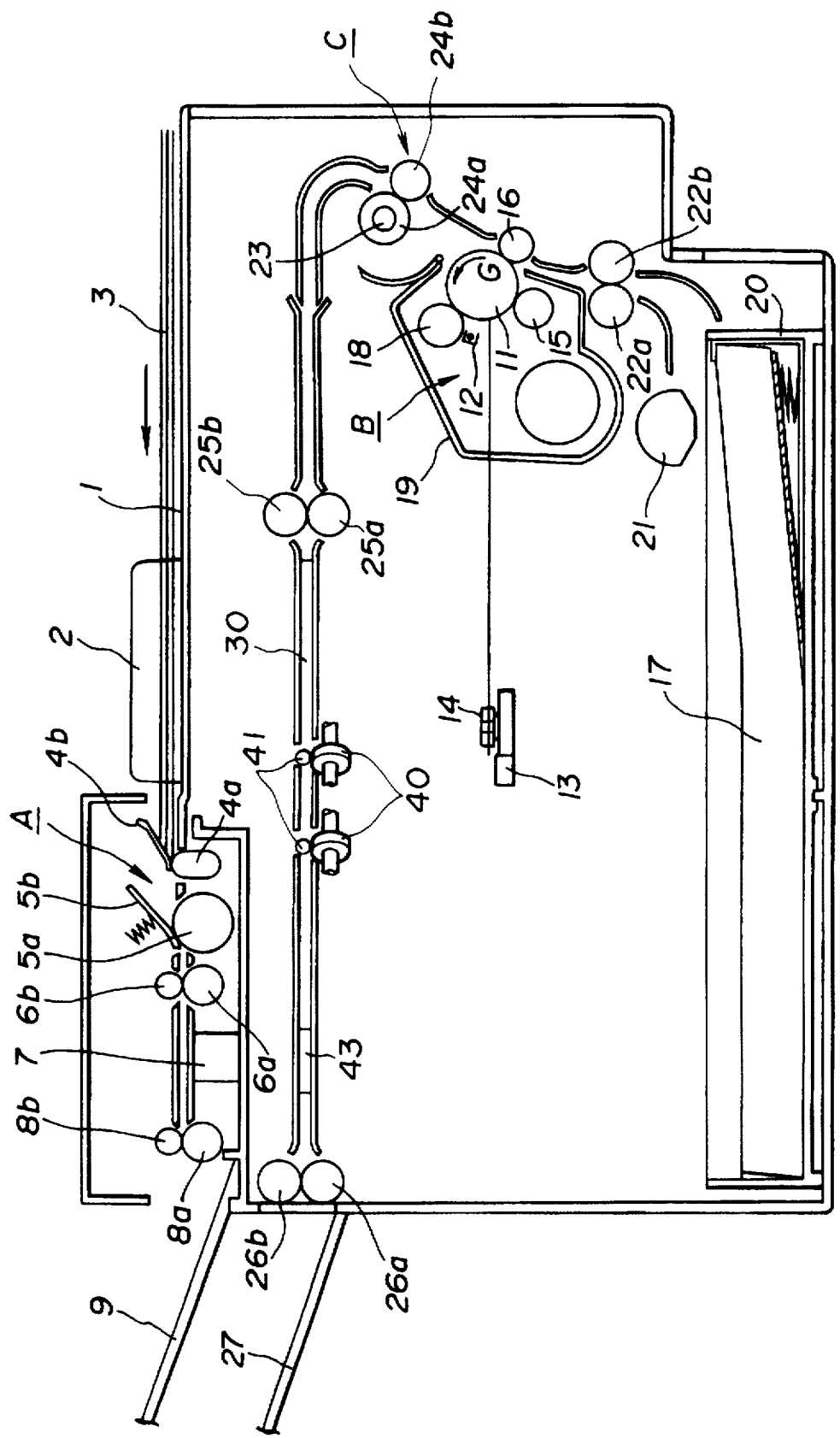
FIG. 13 is a cross-sectional view of a communication apparatus in which ink is coated on an edge of paper according to still another embodiment of the present invention.
Figure 14:
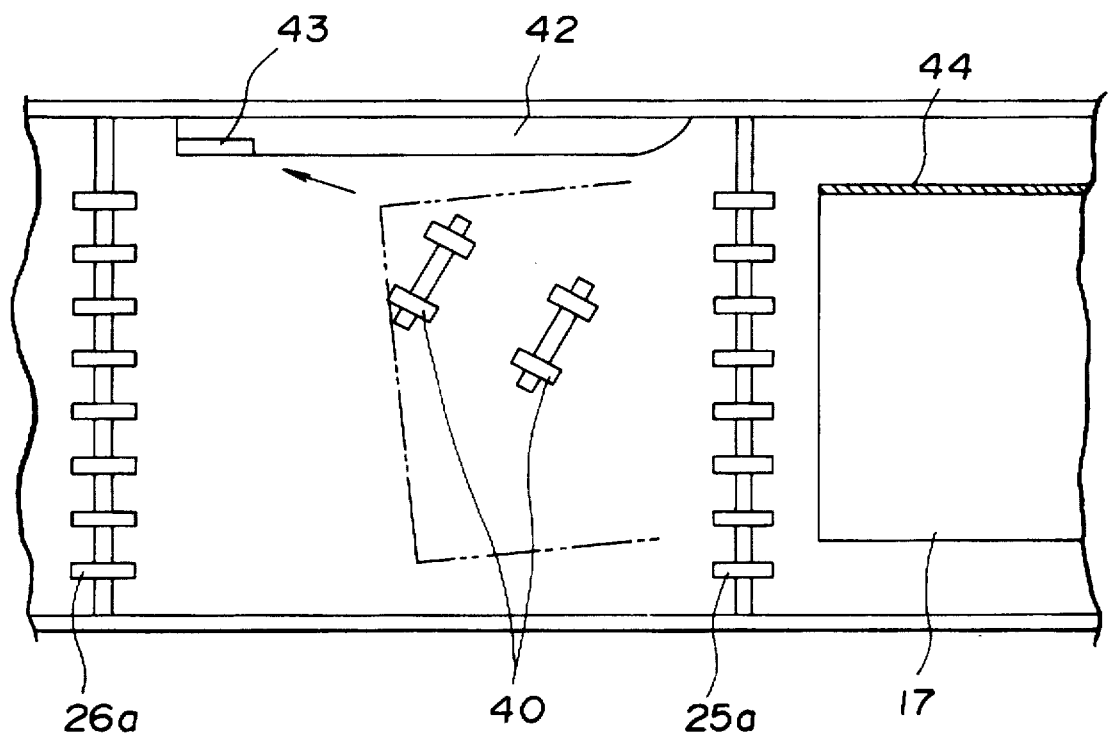
FIG. 14 is a plan view showing a recording-paper conveying path for coating ink on an edge in the embodiment shown in FIG. 13.

Next, an explanation will be provided of a method of performing stamping on an edge of paper with reference to FIGS. 13 and 14. In FIG. 13, the same components as those shown in the above-described embodiments are indicated by the same reference numerals.

Slanting rollers 40, steel balls 41, a reference guide 42 and a stamp 43 are provided between the pair of conveying rollers 25a and 25b and the pair of discharging rollers 26a and 26b. The steel balls 41 are pressed to the side of the slanting rollers 40 with a predetermined pressure.

When the recording sheet 17 is fed from the right, as viewed in FIG. 14, and enters the slanting rollers 40, the recording sheet 17 is moved to the side of the reference guide 42 by the slanting rollers 40, and is pushed until the recording sheet 17 contacts the guide 42. The recording sheet 17 is further advanced to the stamp 43 provided at the back side of the reference guide 42. As a result, ink is coated at an edge portion 44 (see FIG. 14) of the recording sheet 17.

Subsequently, the recording sheet 17 is conveyed until it is discharged by the discharging rollers 26a and 26b.

Although in the above-described embodiment, stamp ink is coated at the left side of the recording sheet 17, the ink may, of course, be coated at the right side. Furthermore, although the recording sheet 17 is moved to the side of the reference guide 42 using the slanting rollers 40, the recording sheet 17 may be moved by any other method, such as conveyance by a belt or the like.

As explained above, by providing a stamp at a midpoint of a recording-sheet conveying path and performing stamping at an edge portion of a recording sheet, a received image output from a communication apparatus, such as a facsimile apparatus or the like, can be recognized. Furthermore, since nothing is added to an original received image, the image can be prevented from being deteriorated in visibility.

As explained above, according to the present invention, by providing a stamp at a midpoint of a recording-sheet conveying path and performing stamping on a recording sheet, it is possible to definitely discriminate an original image output from a communication apparatus, such as a facsimile apparatus or the like.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A communication apparatus capable of reading image data and copying the image data, comprising:

communication means for receiving data;

first recording means for recording received data or read data on recording paper;

second recording means for recording an image indicating a receiving certification on the recording paper;

manual setting means for setting whether or not an operation of said second recording means is executed;

determining means for determining whether a present recording operation is an operation for recording read image data or an operation for recording received data;

control means for controlling a recording operation of said second recording means in accordance with the result of determination performed by said determining means and setting by said manual setting means; and detection means for detecting an area of the received data having less than a predetermined amount of black pixels, wherein, when said manual setting means has been set to record the image indicating the receiving certification, said control means causes said second recording means to record the image indicating the receiving certification on the area of the received data detected by said detection means in accordance with the result of the determination by said determination means.

2. An apparatus according to claim 1, wherein a color recorded by said first recording means is different from a color recorded by said second recording means.

3. An apparatus according to claim 1, wherein a color which is not reproducible by a copier is used as the color recorded by said second recording means.

4. An apparatus according to claim 1, wherein recording means for performing recording using a stamp or discharging ink, or recording means which uses a thermal-transfer-type ribbon is used as said second recording means.

5. An apparatus according to claim 1, wherein ordinary paper is used as the recording paper.

6. An apparatus according to claim 1, wherein said control means controls whether said second recording means records an image.

7. An apparatus to claim 1, wherein said control means changes contents of the image to be recorded by said second recording means.

8. A communication apparatus according to claim 1, wherein said second recording means comprises two recording portions and said control means selects one of said two recording portions of said second recording means.

9. A communication apparatus according to claim 1, wherein said control means prevents said second recording means from executing the recording of the image when said determining means has determined that the present recording operation is an operation for recording read image data, and enables said second recording means to execute the recording of the image when said determining means has determined that the present recording operation is an operation for recording received image data.

10. A communication apparatus according to claim 1, wherein said control means enables said second recording means to execute the recording of a first image when said determining means has determined that the present recording operation is an operation for recording read image data, and enables said second recording means to execute recording of a second image different from said first image when said determining means has determined that the present recording operation is an operation for recording received data.

11. A apparatus according to claim 1, wherein, if said detection means does not detect the area of the received data having less than the predetermined amount of black pixels, said detection means detects an area having the least amount of black pixels relative to other areas of the received data.

12. A communication method capable of reading image data and copying the image data, comprising the steps of:
- a receiving step for receiving data by communication means;
- a first recording step of recording received data or read data on recording paper;
- a second recording step of recording an image indicating a receiving certification on the recording paper;
- a manual setting step for setting whether or not an operation of the second recording step is executed
- a determining step for determining whether the present recording operation is an operation for recording read image data or an operation for recording received data; and
- a controlling step for controlling a recording operation of said second recording means in accordance with the result of determination performed by the determining step and setting by the setting step; and
- a detection step for detecting an area of the received data having less than a predetermined amount of black pixels,
- wherein, when the manual setting step has been set to record the image indicating the receiving certification, the control step causes the second recording step to record the image indicating the receiving certification on the area of the received data detected in said detection step in accordance with the result of the determination step.

13. A communication method according to claim 12, wherein a color recorded by the first recording step is different from a color recorded by the second recording step.

14. A communication method according to claim 13, wherein a color which is not reproducible by a copier is used as the color recorded in the second recording step.

15. A communication method according to claim 12, wherein the second recording step uses a stamp, discharging ink or a thermal-transfer-type ribbon.

16. A communication method according to claim 12, wherein ordinary paper is used as the recording paper.

17. A method according to claim 12, wherein the controlling step controls whether the second recording step records an image.

18. A communication method to claim 12, wherein the controlling step changes contents of the image to be recorded by the second recording step.

19. A communication method according to claim 12, wherein the second recording step uses two recording portions and the controlling step selects one of the two recording portions used in the second recording step.

20. A communication method according to claim 12, wherein the controlling step prevents the second recording step from executing the recording of the image when the determining step has determined that the present recording operation is an operation for recording read image data, and enables the second recording step to execute the recording of the image when the determining step has determined that the present recording operation is an operation for recording received image data.

21. A communication method according to claim 12, wherein the controlling step enables the second recording step to execute the recording of a first image when the determining step has determined that the present recording operation is an operation for recording read image data, and enables the second recording step to execute recording of a second image different from the first image when the determining step has determined that the present recording operation is an operation for recording received data.

22. A method according to claim 12, wherein if, in said detection step, the area of the received data having less than the predetermined amount of black pixels is not detected, then an area having the least amount of black pixels relative to other areas of the received data is detected.

23. A communication apparatus capable of reading image data and copying the image data, comprising:
- communication means for receiving data;
- first recording means for recording received data or read data on recording paper;
- second recording means, including a plurality of stamps, for recording one or more additional images respectively corresponding to said stamps, the additional images being different from each other, on the recording paper in accordance with a recording instruction signal input to said second recording means and without requiring any additional image generation processing;
- manual selecting means for selecting which of the additional images are recorded by said second recording means;
- determining means for determining whether a present recording operation is an operation for recording read image data or an operation for recording received data;
- control means for controlling a recording operation of said second recording means in accordance with the result of the determination performed by said determining means and the selection by said selecting means; and
- detection means for detecting an area of the received data having less than a predetermined amount of black pixels,
- wherein, when there is one or more stamps selected by said manual selecting means, said control means causes said second recording means to record the additional images on the area of the received data detected by said detection means in accordance with the result of the determination and the recording instruction signal.

24. An apparatus according to claim 23, wherein a color recorded by said first recording means is different from a color recorded by said second recording means.

25. An apparatus according to claim 24, wherein a color which is not reproducible by a copier is used as the color recorded by said second recording means.

26. An apparatus according to claim 23, wherein ordinary paper is used as the recording paper.

27. An apparatus according to claim 23, wherein said control means controls whether said second recording means records an image.

28. An apparatus to claim 23, wherein said control means changes contents of the image to be recorded by said second recording means.

29. A communication apparatus according to claim 23, wherein said second recording means comprises two recording portions and said control means selects one of said two recording portions of said second recording means.

30. A communication apparatus according to claim 23, wherein said control means prevents said second recording means from executing the recording of the image when said determining means has determined that the present recording operation is an operation for recording read image data, and enables said second recording means to execute the recording of the image when said determining means has determined that the present operation is an operation for recording received image data.

31. A communication apparatus according to claim 23, wherein said control means enables said second recording means to execute the recording of the first image when said determining means has determined that the present recording operation is an operation for recording read image data, and enables said second recording means to execute recording of a second image different from said first image when said determining means has determined that the present recording operation is an operation for recording received data.

32. A apparatus according to claim 23, wherein if said detection means does not detect the area of the received data having less than the predetermined amount of black pixels, said detection means detects an area having the least amount of black pixels relative to other areas of the received data.

33. A communication method capable of reading image data and copying the image data, comprising the steps of:

a receiving step for receiving data by communication means;

a first recording step of recording received data or read data on recording paper;

inputting a recording instruction signal;

a second recording step of recording one or more of a plurality of additional images respectively corresponding to a plurality of stamps, each of the additional images being different from each other, on the recording paper in accordance with the recording instruction signal and without requiring any additional image generation processing;

a manual selecting step for selecting which of the additional images are recorded in said second recording step;

a determining step for determining whether a present recording operation is an operation for recording read image data or an operation for recording received data; and a controlling step for controlling performance of said second recording step in accordance with the result of the determination performed in said determining step and the selection in said selecting step; and a detection step for detecting an area of the received data having less than a predetermined amount of black pixels, wherein, when there is one or more stamps selected in said manual selecting step, said controlling step causes said second recording step to record the additional images on the area of the received data detected in said detection step in accordance with the result of the determination and the recording instruction signal.

34. A method according to claim 33, wherein a color recorded by the first recording step is different from a color recorded by the second recording step.

35. A method according to claim 34, wherein a color which is not reproducible by a copier is used as the color recorded by the second recording step.

36. A method according to claim 33, wherein ordinary paper is used as the recording paper.

37. A method according to claim 33, wherein the controlling step controls whether the second recording step records an image.

38. A method to claim 33, wherein the controlling step changes contents of the image to be recorded by the second recording step.

39. A communication method according to claim 33, wherein the second recording step comprises two recording portions and the controlling step selects one of the two recording portions of the second recording step.

40. A communication method according to claim 33, wherein the controlling step prevents the second recording step from executing the recording of the image when the determining step has determined that the present recording operation is an operation for recording read image data, and enables the second recording step to execute the recording of the image when the determining step has determined that the present operation is an operation for recording received image data.

41. A communication method according to claim 33, wherein the controlling step enables the second recording step to execute the recording of the first image when the determining step has determined that the present recording operation is an operation for recording read image data, and enables the second recording step to execute recording of a second image different from the first image when the determining step has determined that the present recording operation is an operation for recording received data.

42. A method according to claim 33, wherein if, in said detection step, the area of the received data having less than the predetermined amount of black pixels is not detected, then an area having the least amount of black pixels relative to other areas of the received data is detected.

* * * * *

UNITED STATES PATENT AND TRADEMARK OFFICE
CERTIFICATE OF CORRECTION

PATENT NO. : 5,790,263
DATED      : August 4, 1998
INVENTOR(S): YASUSHI ISHIDA

It is certified that error appears in the above-identified patent and that said Letters Patent is hereby corrected as shown below:

COLUMN 2

Line 10, "discrimated" should read --discriminated--;
Line 17, "apparatus" should read --apparatus according--.

COLUMN 5

Line 60, "position" should read --Position--.

COLUMN 10

Line 18, "256 ," should read --
Line 57, $L_5$." should read --$L_8$.--.

COLUMN 11

Line 48, "can" should read --can be--;
Line 49, "If however" should read --If, however,--.

UNITED STATES PATENT AND TRADEMARK OFFICE
CERTIFICATE OF CORRECTION

PATENT NO. : 5,790,263

DATED : August 4, 1998

INVENTOR(S): YASUSHI ISHIDA

It is certified that error appears in the above-identified patent and that said Letters Patent is hereby corrected as shown below:

<u>COLUMN 18</u>

Line 25, "method" should read --method according--.

Signed and Sealed this

Twenty-eighth Day of December, 1999

Attest:

Q. TODD DICKINSON

Attesting Officer     Acting Commissioner of Patents and Trademarks